US012709523B2

(12) United States Patent
Nakatsuka et al.

(10) Patent No.: US 12,709,523 B2
(45) Date of Patent: Aug. 18, 2026

(54) CRANE, CRANE ASSEMBLY METHOD AND DISASSEMBLY METHOD

(71) Applicant: KOBELCO CONSTRUCTION MACHINERY CO., LTD., Hiroshima (JP)

(72) Inventors: Kenichi Nakatsuka, Hyogo (JP); Koji Sumimoto, Hyogo (JP); Shingo Kurihara, Hyogo (JP); Takao Eto, Hyogo (JP); Tsukasa Wamata, Hyogo (JP); Daisuke Takaoka, Hyogo (JP); Takuya Watanabe, Hyogo (JP); Teppei Ikawa, Hyogo (JP); Hiromitsu Hamaguchi, Hyogo (JP); Yukio Koizumi, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 571 days.

(21) Appl. No.: 18/245,230

(22) PCT Filed: Sep. 16, 2021

(86) PCT No.: PCT/JP2021/034068
§ 371 (c)(1),
(2) Date: Mar. 14, 2023

(87) PCT Pub. No.: WO2022/085344
PCT Pub. Date: Apr. 28, 2022

(65) Prior Publication Data
US 2023/0348241 A1 Nov. 2, 2023

(30) Foreign Application Priority Data
Oct. 19, 2020 (JP) ................................ 2020-175373

(51) Int. Cl.
*B66C 23/82* (2006.01)

(52) U.S. Cl.
CPC .................................... *B66C 23/82* (2013.01)

(58) Field of Classification Search
CPC ......... B66C 23/42; B66C 23/46; B66C 23/66; B66C 23/68; B66C 23/702; B66C 23/82; B66C 23/821; B66C 23/823; B66C 23/92
See application file for complete search history.

(56) References Cited

U.S. PATENT DOCUMENTS 3,945,333 A * 3/1976 Fritsch .................. B66C 23/702
212/292
3,968,884 A * 7/1976 Johnson ................ B66C 23/702
52/114

(Continued)

FOREIGN PATENT DOCUMENTS

GB 2081210 A * 2/1982 ........... B66C 23/702
JP 10-218563 A 8/1998

(Continued)

OTHER PUBLICATIONS

International Search Report mailed on Dec. 14, 2021 in PCT/JP2021/034068 filed on Sep. 16, 2021 (3 pages).

*Primary Examiner* — Robert W Hodge
*Assistant Examiner* — Juan J Campos, Jr.
(74) *Attorney, Agent, or Firm* — Oblon, McClelland, Maier & Neustadt, L.L.P.

(57) ABSTRACT

A crane includes a jib posture retention device that retains a jib in a frontward tilt posture to a boom. The jib posture retention device includes a jib mast that holds a rope connection part at a tensioning position separate from a jib proximal end and a boom distal end backward thereof to render a jib-side support rope and a boom-side support rope linearly tensioned with the jib in the frontward tilt posture. The jib mast is shiftable to a tension form of holding the rope connection part at a tensioning position in an uprise posture and a looseness allowing form of locating the rope connec- (Continued)

tion part at a looseness allowing position closer to the boom distal end than the tensioning position and closer to the jib proximal end than the tensioning position to allow the jib-side support rope and the boom-side support rope to be loosened.

24 Claims, 14 Drawing Sheets

(56) References Cited

U.S. PATENT DOCUMENTS

| | | | | |
|---|---|---|---|---|
| 4,383,616 A * | 5/1983 | Sterner | B66C 23/702 212/299 |
| 4,473,214 A * | 9/1984 | Sterner | B66C 23/702 248/654 |
| 2021/0171323 A1 | 6/2021 | Takaoka | |
| 2021/0269289 A1 | 9/2021 | Kitazumi et al. | |

FOREIGN PATENT DOCUMENTS

| | | |
|---|---|---|
| JP | 2005-145569 A | 6/2005 |
| JP | 2011-190084 A | 9/2011 |
| JP | 2017-137164 A | 8/2017 |
| JP | 2018-048015 A | 3/2018 |
| JP | 2019-112152 A | 7/2019 |
| WO | WO 2019/111642 A1 | 6/2019 |
| WO | WO 2020/026842 A1 | 2/2020 |

* cited by examiner

CRANE, CRANE ASSEMBLY METHOD AND DISASSEMBLY METHOD

TECHNICAL FIELD

The present invention relates to a crane, and methods for assembling and disassembling a crane.

BACKGROUND ART

Conventionally known is a crane including a boom provided to a crane body capably of derricking and a jib connected to the distal end of the boom, wherein a hook device is suspended from the distal end of the jib to perform crane work. For example, the following Patent Literature 1 discloses an example of such a crane.

The crane disclosed in Patent Literature 1 includes a turning body as a crane body, a boom attached to the turning body rotatably about a rotation axis extending in the right-left direction of the turning body, and a jib attached to the distal end of the boom rotatably about an axis parallel to the rotation axis of the boom. The crane further includes a jib mast, a jib pendant rope and a rear jib pendant rope to retain the jib in a frontward tilt posture in which the jib is tilted frontward with respect to the boom having uprisen, at a predetermined angle.

The jib mast is attached to the distal end of the boom rotatably about an axis parallel to the rotation axis of the jib. The jib mast can be in an uprise posture of extending from the distal end of the boom backward thereof and perpendicularly to the rotation axis of the jib when the boom has uprisen. The jib pendant rope is tensioned between the distal end of the jib mast and the distal end of the jib. Specifically, one end of the pendant rope is connected to the distal end of the jib mast separably through a connection pin, while the other end of the jib pendant rope is connected to the distal end of the jib. The rear jib pendant rope is tensioned between the distal end of the jib mast and the boom. Specifically, one end of the rear pendant rope is connected to the distal end of the jib mast separably through a connection pin, while the other end of the rear pendant rope is connected to a specific place of the boom, the place being separate from the distal end of the boom toward the proximal end of the boom.

In the state where the boom has uprisen, the rear jib pendant rope is linearly tensioned between the boom and the distal end of the jib mast to prevent the jib mast from rotational movement frontward from the uprise posture, and the jib pendant rope is linearly tensioned between the distal end of the jib mast and the distal end of the jib to prevent the jib from rotational movement frontward from the predetermined frontward tilt posture. The jib is, thus, retained in the predetermined frontward tilt posture with respect to the boom by the jib mast, the jib pendant rope, and the rear jib pendant rope.

For assembly of the crane disclosed in Patent Literature 1, the proximal end of the boom is attached to the turning body while the boom is laid so as to extend frontward from the turning body along the ground, and the proximal end of the jib is attached to the distal end of the boom while the jib is laid down so as to extend further frontward from the distal end of the boom. Then, in a posture where the jib mast is laid on the jib along the jib that is laid from the distal end of the laid boom, one end of the pendant rope is connected to the distal end of the jib mast while the other end of the jib pendant rope is connected to the distal end of the jib. In this state, one end of the rear jib pendant rope is connected to the distal end of the jib mast. The jib mast is thereafter raised with the proximal end thereof as a fulcrum, and the other end of the rear jib pendant rope is connected to a rope connection place of the boom. The boom is thereafter slightly raised to render the pendant rope linearly tensioned between the distal end of the jib mast and the distal end of the jib and to render the rear jib pendant rope linearly tensioned between the distal end of the jib mast and the rope connection place of the boom. The boom is then raised to a posture of standing up from the turning body, and the jib is supported by the jib mast, the jib pendant rope, and the rear jib pendant rope on the back side to be retained in the predetermined frontward tilt posture with respect to the boom.

Besides, the crane is disassembled in the order reverse to that for assembly.

The crane disclosed in Patent Literature 1 involves a problem of very large burden on a worker in the work of installing the jib rear pendant rope as the boom-side support rope between the distal end of the jib mast and the rope connection place of the boom and the work of removing the installed rear jib pendant rope. Especially large is the worker's burden for the attachment/detachment of the other end of the rear jib pendant rope to/from the rope connection place of the boom.

Specifically, upon the connection of the other end of the rear jib pendant rope to the rope connection place of the boom in the crane disclosed in Patent Literature 1, the rear jib pendant rope is drooped from the distal end of the jib mast having risen to render the other end of the rear jib pendant rope close to the jib mast, which requires a worker to draw the other end of the rear jib pendant rope to the rope connection place of the boom in order to connect the other end to the rope connection place. Thus drawing the other end of the rear jib pendant rope, which is heavy, needs significant effort, increasing the burden on a worker.

Besides, in order to remove the other end of the rear side pendant rope from the rope connection place of the boom, the connection pin connecting the other end to the rope connection has to be extracted from the rope connection place; however, the connection pin cannot be extracted from the rope connection part without releasing the tension on the rear jib pendant rope, the tension being applied to the connection pin. To release the tension applied to the connection pin, the worker has to pull the rear jib pendant rope, which work requires a large amount of labor, thus increasing the burden on a worker.

CITATION LIST

Patent Literature

Patent Literature 1: Japanese Unexamined Patent Publication No. 2011-190084

SUMMARY OF INVENTION

It is an object of the present invention to provide a crane and a method for assembling the crane, and a method for disassembling the crane, which are capable of reducing the burden on a worker in the work of installing a jib-side support rope and the work of removing the installed jib-side support rope and also reducing the burden on a worker in the work of installing a boom-side support rope and the work of removing the installed boom-side support rope.

A crane in accordance with one aspect of the present invention includes: a crane body; a boom having a boom proximal end attached to the crane body rotatably about a boom rotation axis extending in a right-left direction of the crane body relatively to the crane body and a boom distal end opposite to the boom proximal end, the boom being capable of derricking with the boom proximal end as a fulcrum; a jib having a jib proximal end attached to the boom distal end rotatably about a jib rotation axis parallel to the boom rotation axis and a jib distal end opposite to the jib proximal end; and a jib posture retention device that retains the jib in a predetermined frontward tilt posture with respect to the boom when the boom has uprisen. The boom has a rope connection place at a position separate from the boom distal end toward the boom proximal end. The jib posture retention device includes: a jib-side support rope having one end connected to the jib distal end and the other end opposite to the one end; a boom-side support rope having one end connected to the rope connection place of the boom and the other end opposite to the one end: a rope connection part to which the other end of the jib-side support rope and the other end of the boom-side support rope are separably connected; and a jib mast that supports the jib in a predetermined frontward tilt posture in cooperation with the jib-side support rope and the boom-side support rope on a back side of the jib, by holding the rope connection part at a tensioning position while the jib mast is attached to an attachment object that is one of the boom distal end and the jib proximal end when the jib is in the predetermined frontward tilt posture. The tensioning position is a position at which the rope connection part is separated from the jib proximal end and the boom distal end backward of the jib proximal end and the boom distal end to an extent that the jib-side support rope is linearly tensioned between the rope connection part and the rope connection place and the boom-side support rope is linearly tensioned between the rope connection part and the rope connection place of the boom. The jib mast is configured to be shiftable to any of a tension form of holding the rope connection part at the tensioning position in an uprise posture in which the jib mast extends from the attachment object backward of the attachment object and a looseness allowing form of locating the rope connection part at a looseness allowing position. The looseness allowing position is a position closer to the boom distal end than the tensioning position and closer to the jib proximal end than the tensioning position to allow the jib-side support rope and the boom-side support rope to be loosened.

A method of assembling the crane according to another aspect of the present invention includes: a step of attaching the boom proximal end to the crane body and placing the boom in a posture of lying down so as to extend frontward from the crane body; a step of attaching the jib proximal end to the boom distal end of the boom lying down and placing the jib in a posture of lying down so as to extend frontward from the boom distal end; rendering the jib mast in the looseness allowing form to thereby locate the rope connection part at the looseness allowing position; a step of connecting one end of the jib-side support rope to the jib distal end of the jib lying down and connecting the other end of the jib-side support rope to the rope connection part located at the looseness allowing position to thereby install the jib-side support rope between the jib distal end and the rope connection part; a step of connecting one end of the boom-side support rope to the rope connection place of the boom lying down and connecting the other end of the boom-side support rope to the rope connection part located at the looseness allowing position to thereby install the boom-side support rope between the rope connection place of the boom and the rope connection part; a step of shifting the jib mast from the looseness allowing form to the tension form to thereby move the rope connection part, to which the other end of the jib-side support rope and the other end of the boom-side support rope are connected, from the looseness allowing position to the tensioning position; a step of raising the boom so as to bring the jib into the predetermined frontward tilt posture to render the jib-side support rope linearly tensioned between the jib distal end and the rope connection part located at the tensioning position and to render the jib-side support rope linearly tensioned between the rope connection place of the boom and the rope connection part located at the tensioning position, thereby making the jib in the predetermined frontward tilt posture be supported by the jib-side support rope, the boom-side support rope and the jib mast on a back side of the jib to retain the jib in the predetermined frontward tilt posture.

Besides, a method of disassembling the crane according to another aspect of the present invention includes: a step of laying down the boom and the jib so that the boom extends frontward from the crane body and the jib extends frontward from the boom distal end of the boom; a step of shifting the jib mast from the tension form to the looseness allowing form to thereby move the rope connection part, to which the other end of the jib-side support rope and the other end of the boom-side support rope are connected, from the tensioning position to the looseness allowing position; a step of removing one end of the jib-side support rope from the jib distal end of the jib lying down and removing the other end of the jib-side support rope from the rope connection part located at the looseness allowing position; a step of removing one end of the boom-side support rope from the rope connection place of the boom lying down and removing the other end of the boom-side support rope from the rope connection part located at the looseness allowing position; a step of removing the jib proximal end from the boom distal end of the boom lying down to thereby separating the jib from the boom; and a step of removing the boom proximal end of the boom lying down from the crane body to thereby separate the boom from the crane body.

DETAILED DESCRIPTION

Below will be described embodiments of the present invention with reference to the drawings.

First Embodiment

With reference to FIGS. 1 to 5, will be primarily described a configuration of a crane 100 according to a first embodiment of the present invention.

Figure 1:
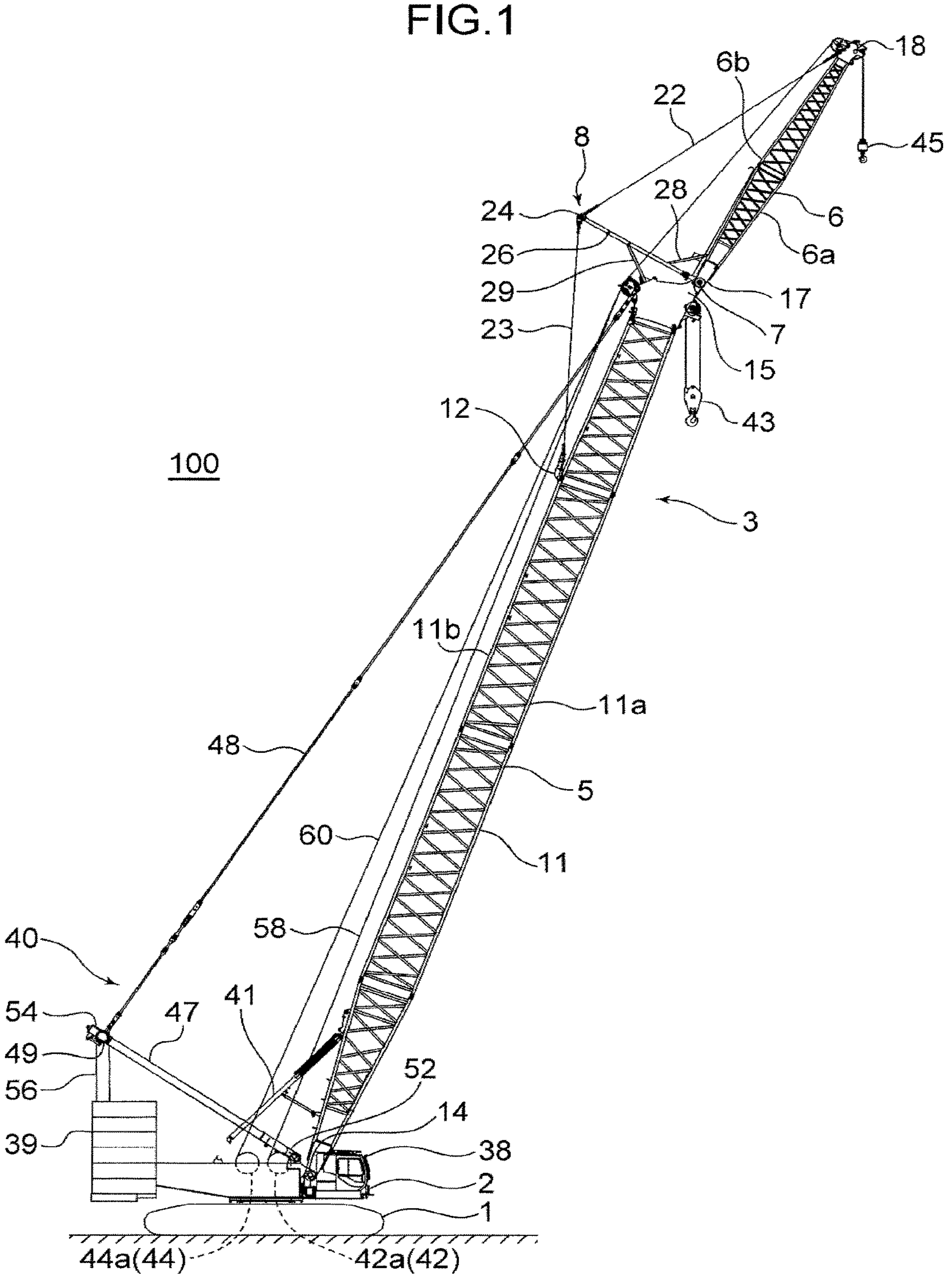
FIG. 1 is a side view of a crane according to a first embodiment of the present invention.

As shown in FIG. 1, the crane 100 according to the first embodiment of the present invention includes a traveling body 1 capable of self-traveling, a turning body 2 mounted on the traveling body 1 capably of turning around a vertically extending turning axis, and a derricking member 3 attached to the turning body 2 capably of derricking for performing hoisting work. The turning body 2 is an example of a crane body according to the present invention.

The derricking member 3 includes a boom 5, a jib 6, a jib connection pin 7, a jib posture retention device 8, and a support pin 9.

The boom 5 is attached to the turning body 2 capably of derricking. The boom 5 includes a boom body 11 extending linearly and forming a lattice structure, and a boom-side rope connection place 12 mounted on the boom body 11.

The boom body 11 has a boom proximal end 14 that is one end longitudinal of the boom body 11 and a boom distal end 15 opposite to the boom proximal end 14. The boom proximal end 14 is attached to the front end of the turning body 2 rotatably around a rotation axis extending in the right-left direction of the turning body 2. The right-left direction is a direction orthogonal to each of the extension direction of the turning axis of the turning body 2 and the front-rear direction of the turning body 2. By such attachment of the boom proximal end 14 to the turning body 2, the boom 5 is allowed to derrick with the rotation axis of the boom proximal end 14 as a fulcrum. The boom proximal end 14 is separably attached to the turning body 2

Figure 2:
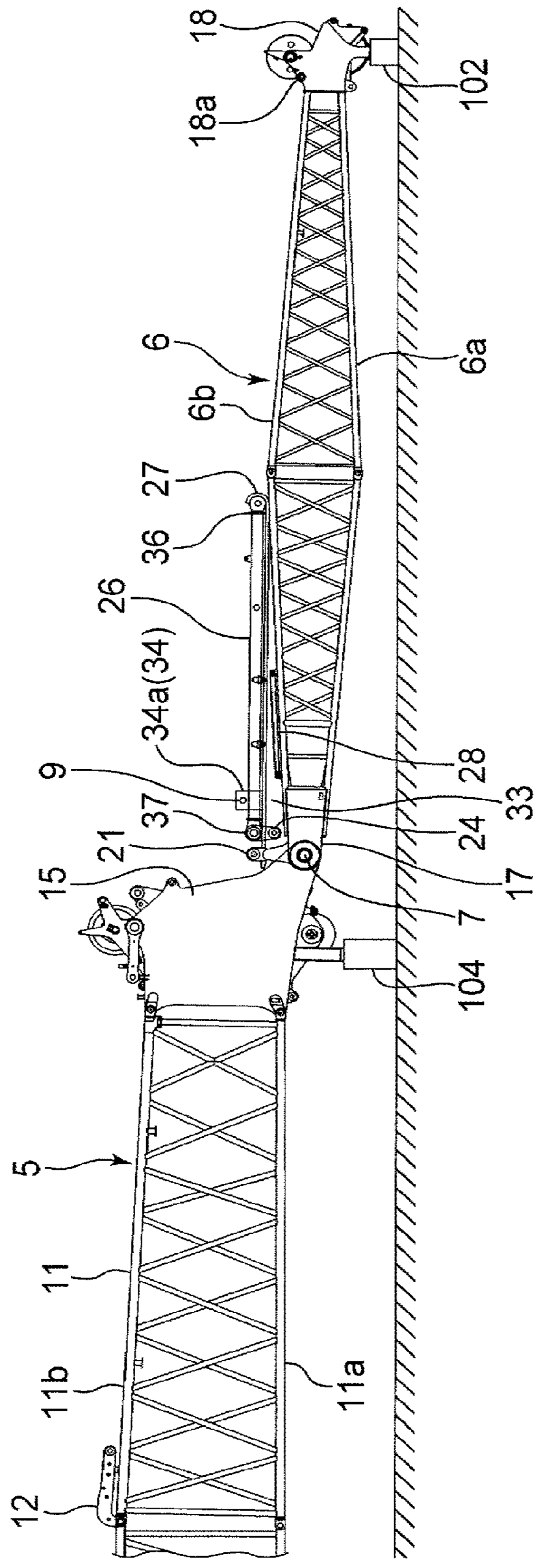
FIG. 2 is a side view showing a state where a derricking member of the crane according to the first embodiment is laid down and showing the step of assembling the derricking member and a jib posture retention device.

The boom body 11 has a ventral surface 11*a* facing frontward when the boom 5 stands up as shown in FIG. 1, and a back surface 11*b* facing backward in the same state. The "frontward" means "in a direction from the below-described counterweight 39 to the cab 38, and the "backward" is opposite thereto. The ventral surface 11*a* is a surface facing downward in a state where the boom 5 is laid down as shown in FIG. 2, and the back surface 11*b* is a surface facing upward in the same state.

The boom-side rope connection place 12 is a part to which one end of the below-described boom-side support rope 23 of the jib posture retention device 8 is separably connected. The boom-side rope connection place 12 is located at a position separate from the boom distal end 15 by a predetermined distance toward the boom proximal end 14, being provided on the back surface 11*b* of the boom body 11.

The jib 6 is attached to the boom distal end 15 rotatably about an axis parallel to the rotation axis of the boom 5 (the rotation axis of the boom proximal end 14) relatively to the boom distal end 15. The jib 6 is attachable to and detachable from the boom distal end 15. The jib 6 extends linearly and has a lattice structure. The jib 6 has a ventral surface 6*a* facing frontward in a state where both the jib 6 and the boom 5 stand up as shown in FIG. 1, and a back surface 6*b* facing backward in the same state. The ventral surface 6*a* is a surface facing downward in a state where the boom 5 and the jib 6 are laid down as shown in FIG. 2, and the back surface 6*b* is a surface facing upward in the same state. The jib 6 has a jib proximal end 17, which is one end in the longitudinal direction (extension direction) thereof, and a jib distal end 18, which is the end opposite to the jib proximal end 17.

The jib proximal end 17 is attached to the boom distal end 15 rotatably about an axis extending parallel to the rotation axis of the boom 5 relatively to the boom distal end 15. Specifically, the jib proximal end 17 is connected to the boom distal end 15 through a jib connection pin 7 extending parallel to the rotation axis of the boom 5 and allowed to be rotationally moved relatively to the boom distal end 15 about the jib connection pin 7. The jib proximal end 17 is attachable to and detachable from the boom distal end 15. Specifically, the jib proximal end 17 can be separated from the boom distal end 15 by the extraction of the jib connection pin 7 from the jib proximal end 17 and the boom distal end 15.

The jib proximal end 17 is an example of an attachment object according to the present invention. The jib proximal end 17 allows the below-described jib mast 26 of the jib posture retention device 8 to be attached to the jib proximal end 17 when the jib mast 26 is in an uprise posture. Specifically, the jib proximal end 17 has an uprising-proximal-end support part 21 that allows a jib-mast proximal end 36, which is the proximal end of the jib mast 26, to be attached to the uprising-proximal-end support part 21 and supports the jib-mast proximal end 36 when the jib mast 26 of the jib posture retention device 8 is in the uprise posture. The uprising-proximal-end support part 21 is provided on the rear-surface-6*b* side of the jib proximal end 17. The uprising-proximal-end support part 21 is configured to support the jib-mast proximal end 36 through the support pin 9 as described below. The uprising-proximal-end support part 21 is provided with an unillustrated through-hole allowing the support pin 9 to be fitted thereinto.

The jib distal end 18 has a jib-side rope connection place 18*a* to which one end of the below-described jib-side support rope 22 of the jib posture retention device 8 is separably connected.

The jib posture retention device 8 is configured to retain the jib 6 in a predetermined frontward tilt posture relative to the boom 5 in a state where the boom 5 has uprisen. The predetermined frontward tilt posture is, specifically, the rotational posture of the jib 6 in which the jib 6 is tilted frontward by a predetermined angle from the axis direction (extension direction) of the boom 5. The jib posture retention device 8 includes a jib-side support rope 22, a boom-side support rope 23, a rope connection part 24, two connection pins 25*a*, 25*b*, a jib mast 26, a lying-proximal-end holding part 27, a mast posture retaining member 28, a jib-mast back stop 29, a guide part 33, and a storage holding part 34.

The jib-side support rope 22 is installed between the rope connection part 24 provided on the jib-jib-mast distal end 37, which is the distal end of the jib mast 26, as described below, and the jib-side rope connection place 18*a* of the jib distal end 18 to interconnect the rope connection part 24 and the jib distal end 18. The jib-side support rope 22 has one end to be connected to the jib-side rope connection place 18*a* and the other end, which is the opposite end thereto, to be connected to the rope connection part 24. The one end of the jib-side support rope 22 is connected to the jib-side rope connection place 18*a* through an unillustrated connection pin. The other end of the jib-side support rope 22 is connected to the rope connection part 24 through an unillustrated connection pin.

The boom-side support rope 23 is installed between the rope connection part 24 provided on a jib-mast distal end 37 as described below and the boom-side rope connection place 12 to interconnect the rope connection part 24 and the boom-side rope connection place 12. The boom-side support rope 23 has one end to be connected to the boom-side rope connection place 12 and the other end, which is the end opposite thereto, to be connected to the rope connection part 24. The one end of the boom-side support rope 23 is connected to the boom-side rope connection place 12 through an unillustrated connection pin. The other end of the boom-side support rope 23 is connected to the rope connection part 24 through an unillustrated connection pin.

The rope connection part 24 is attached to the below-described jib-mast distal end 37, which is the distal end of the jib mast 26. The rope connection part 24 allows the other end of the jib-side support rope 22 and the other end of the boom-side support rope 23 to be separably connected to the rope connection part 24. The other end of the jib-side support rope 22 and the other end of the boom-side support rope 23 are connected to the rope connection part 24 through the two connection pins 25*a*, 25*b*, respectively.

Specifically, the rope connection part 24 is provided with an unillustrated first hole that allows the connection pin 25*a* for connecting the other end of the jib-side support rope 22 to be fitted thereinto, and an unillustrated second hole that allows the connection pin 25*b* for connecting the other end of the boom-side support rope 23 to be fitted thereinto. By fitting the connection pin 25*a* into the first hole and connecting the other end of the jib-side support rope 22 to the connection pin 25*a*, the other end of the jib-side support rope 22 is connected to the rope connection part 24. Besides, by fitting the connection pin 25*b* into the second hole and joining the other end of the boom-side support rope 23 to the connection pin 25*b*, the other end of the boom-side support rope 23 is connected to the rope connection part 24. By extracting the connection pin 25*a* from the first hole to remove it from the rope connection part 24, the connection of the other end of the jib-side support rope 22 to the rope connection part 24 is released. Besides, by extracting the connection pin 25*b* from the second hole to remove it from the rope connection part 24, the connection of the other end of the boom-side support rope 23 to the rope connection part 24 is released.

The jib mast 26 is configured to support the rope connection part 24 at a tensioning position that is separate from the jib proximal end 17 and the boom distal end 15 backward of the jib proximal end 17 and the boom distal end 15 in the extent of rendering each of the jib-side support rope 22 and the boom-side support rope 23 which are connected to the rope connection part 24 linearly tensioned when the jib 6 is in the predetermined frontward tilt posture. The jib mast 26 supports the jib in the predetermined frontward tilting posture on the back side of the jib mast 26 in cooperation with the jib-side support rope 22 and the boom-side support rope 23 which are linearly tensioned. The back side with respect to the boom 5 means the opposite side to the ventral surface 11*a* across the back surface 11*b* of the boom body 11, and the back side with respect to the jib 6 means the opposite side to the ventral surface 6*a* across the back surface 6*b* of the jib 6. The jib mast 26 has a shape of cylindrical or square tube extending linearly. The jib mast 26 has the jib-mast proximal end 36, which is one end in the longitudinal direction thereof, and the jib-mast distal end 37, which is the opposite end to the jib-mast proximal end 36.

The jib mast 26 is configured to be shiftable to any of a tension form (see FIGS. 1 and 5), a looseness allowing form (see FIG. 3), and a storage form (see FIG. 2). The tension form is a form in which the jib mast 26 locates and supports the rope connection part 24, which is provided in the jib-mast distal end 37, at the tensioning position. The looseness allowing form is a form in which the jib mast 26 locates the rope connection part 24 at a looseness allowing position (see FIG. 3), which is a position closer to each of the boom distal end 15 and the jib proximal end 17 than the tensioning position, wherein the linear distance from the jib-side rope connection place 18*a* of the jib distal end 18 to the looseness allowing position is smaller than the length of the jib-side support rope 22 and the linear distance from the boom-side rope connection place 12 to the looseness allowing position is smaller than the length of the boom-side support rope 23. The storage form is a form in which the jib mast 26 is laid along the jib 6 and fixed to the jib 6.

Specifically, the jib mast 26 is shifted to the tension form for perform of crane work during which the boom 5 and the jib 6 are raised as shown in FIG. 1 in the crane 100 that has been assembled. In the tension form, the jib mast 26 is in an uprise posture where the jib mast 26 extends from the jib proximal end 17 backward of the jib proximal end 17 along a direction orthogonal to the rotation axis of the jib 6 and orthogonal to the axis direction of the jib 6. The axis direction of the jib 6 is, in other words, the longitudinal direction of the jib 6, or the extension direction of the jib 6. In the uprise posture of the jib mast 26, the jib-mast proximal end 36 is supported by the uprising-proximal-end support part 21. The jib-mast proximal end 36 is composed of a clevis having an arcuate-curved outer surface. The jib-mast proximal end 36 is supported by the uprising-proximal-end support part 21 rotatably about an axis parallel to the rotation axis of the jib 6. Specifically, the jib-mast proximal end 36 is supported by the uprising-proximal-end support part 21 through a support pin 9 extending parallel to the rotation axis of the jib 6. The jib-mast proximal end 36 is provided with an unillustrated through-hole. The support pin 9 is insertable into and extractable from each of the through-holes provided in the jib-mast proximal end 36 and the uprising-proximal-end support part 21, respectively. The jib-mast proximal end 36 is, therefore, allowed to be detached from the uprising-proximal-end support part 21 by the extraction of the support pin 9 from the through-hole of the jib-mast proximal end 36 and the through-hole of the uprising-proximal-end support part 21.

The jib mast 26 is shifted to the looseness allowing form when the jib-side support rope 22 is installed between the rope connection part 24 and the jib distal end 18 and the boom-side support rope 23 is installed between the rope connection part 24 and the boom-side rope connection place 12 for assembling the crane 100 and when the installed jib-side support rope 22 and boom-side support rope 23 are removed for disassembling the crane 100. In the looseness allowing form, the jib mast 26 is in a looseness-allowing lying posture (see FIG. 3) in which the jib mast 26 is laid down so as to locate the rope connection part 24 at the looseness allowing position wherein the jib-mast distal end 37 is closer to the boom distal end 15 than the jib-mast proximal end e36 and the jib-mast proximal end 36 is closer to the jib distal end 18 than the jib-mast distal end 37. The looseness-allowing lying posture is a posture in which the jib mast 26 is tilted from the axis direction of the jib 6 so as to gradually separate from the jib 6 backward of the jib 6 from the jib-mast proximal end 36 toward the jib-mast distal end 37.

When the other end of the jib-side support rope 22 and the other end of the boom-side support rope 23 are attached to or detached from the rope connection part 24, the boom 5 and the jib 6 are laid down substantially along the ground, and the jib mast 26 is rendered in the looseness-allowing lying posture relative to the boom 5 and jib 6 that are thus laid down to thereby locate the rope connection part 24 at the looseness allowing position. In this state, the rope connection part 24 is located at a height position above the jib proximal end 17 and in the vicinity of the height position of the back surface of the boom distal end 15. The height position of the rope connection part 24 from the ground in this state is a position allowing a worker on the ground or on a table placed on the ground to perform work for attachment/detachment of the other end of the jib-side support rope 22 and the other end of the boom-side support rope 23 to/from the rope connection part 24.

The jib mast 26 is shifted to the storage form when the crane 100 is disassembled and transferred. Specifically, when the jib 6 is separated from the boom 5 for disassembly of the crane 100, the jib mast 26 is handled integrally with the jib 6 while being in the storage form and also transported integrally with the jib 6 in the storage form. In the storage form, the jib mast 26 is in a storage lying posture in which the jib mast 26 is further laid down beyond the looseness-allowing lying posture and laid along the jib 6 so that the jib-mast distal end 37 is closer to the boom distal end 15 than the jib-mast proximal end 36 and the jib-mast proximal end 36 is closer to the jib distal end 18 than the jib-mast distal end 37.

The lying-proximal-end holding part 27 is a part that holds the jib-mast proximal end 36 at a position on the jib 6 and separate from the jib proximal end 17 toward the jib distal end 18 when the jib mast 26 is in the looseness-allowing lying posture or storage lying posture and during the shift from one of the looseness-allowing lying posture and the storage lying posture to the other thereof. The lying-proximal-end holding part 27 is attached to the jib 6 and located at a position separate from the jib proximal end 17 toward the jib distal end 18 on the jib 6. Specifically, the lying-proximal-end holding part 27 is disposed on the back surface 6*b* of the jib 6 at a position separate from the uprising-proximal-end support part 21 of the jib proximal end 17 toward the jib distal end 18 by a predetermined distance. The lying-proximal-end holding part 27 is arcuate and opened toward the jib proximal end 17 (toward the uprising-proximal-end support part 21). The lying-proximal-end holding part 27 is configured to receive the jib-mast proximal end 36 through the opening thereof and hold it. The lying-proximal-end holding part 27 has an arcuate inner surface that receives the arcuate curved outer surface of the jib-mast proximal end 36 composed of the clevis to thereby hold the jib-mast proximal end 36 so as to allow the jib-mast proximal end 36 to be moved rotationally about an axis parallel to the rotation axis of the jib 6 (the rotation axis of the jib proximal end 17). Besides, the lying-proximal-end holding part 27 allows the jib-mast proximal end 36 to be removed from the lying-proximal-end holding part 27 toward the jib proximal end 17 when the jib mast 26 is shifted from the looseness-allowing lying posture to the uprise posture.

Figure 3:
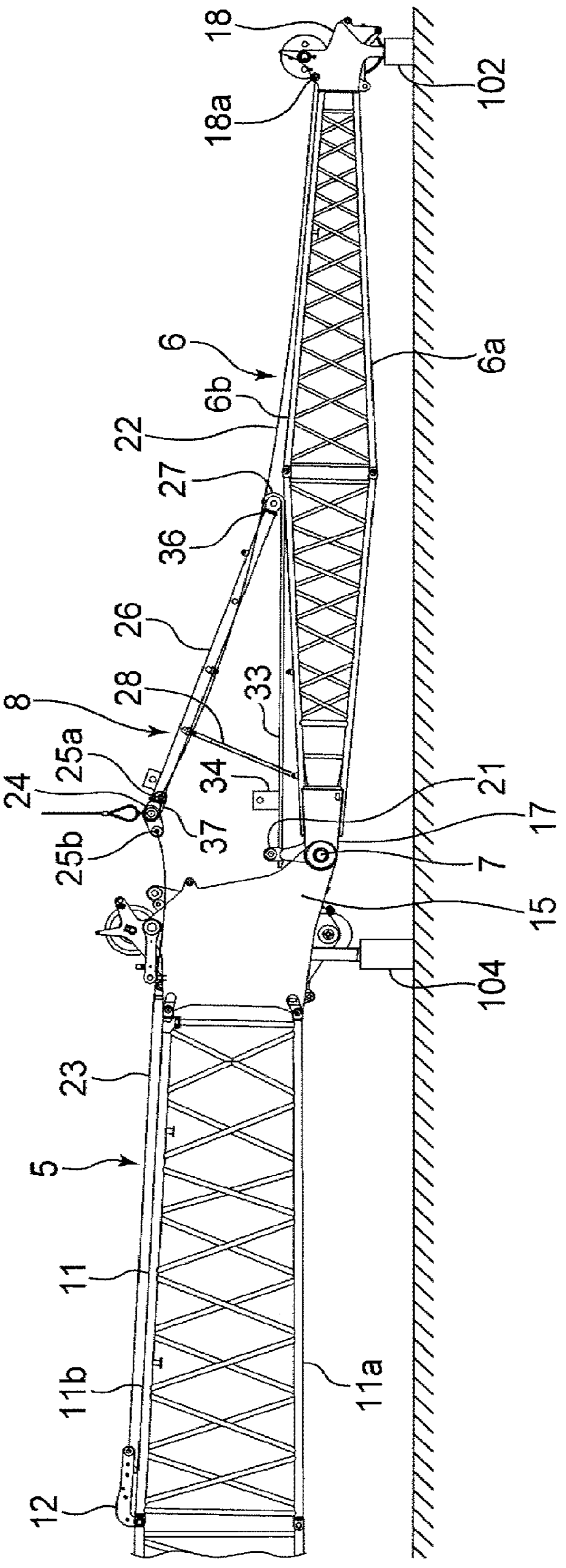
FIG. 3 is a side view showing a state where the derricking member of the crane according to the first embodiment is laid down and showing the step of assembling the derricking member and the jib posture retention device.

The mast posture retaining member 28 is, as shown in FIG. 3, configured to be interposed between the jib mast 26 in the looseness-allowing lying posture and the jib 6 to retain the posture. The mast posture retaining member 28 is a rod-like member. When interposed between the jib mast 26 in the looseness-allowing lying posture and the jib 6, the mast posture retaining member 28 is placed in a posture of extending in a direction crossing respective axis directions of the jib mast 26 and the jib 6 in the looseness-allowing lying posture and one end of the mast posture retaining member 28 in the longitudinal direction (extension direction) is connected to the jib mast 26 while the other end, which is an end opposite to the one end, of the mast posture retaining member 28 is connected to the jib 6. The one end of the mast posture retaining member 28 is attachable to and detachable from the jib mast 26, and the other end of the mast posture retaining member 28 is attachable to and detachable from the jib 6. When the jib mast 26 is shifted from the looseness-allowing lying posture (the looseness allowing form) to the uprise posture (the tension form) or the storage lying posture (the storage form), the connection of the mast posture retaining member 28 to the jib mast 26 is released, and the mast posture retaining member 28 is located at a position where the mast posture retaining member 28 is unobstructive to the shift of the posture of the jib mast 26.

Figure 5:
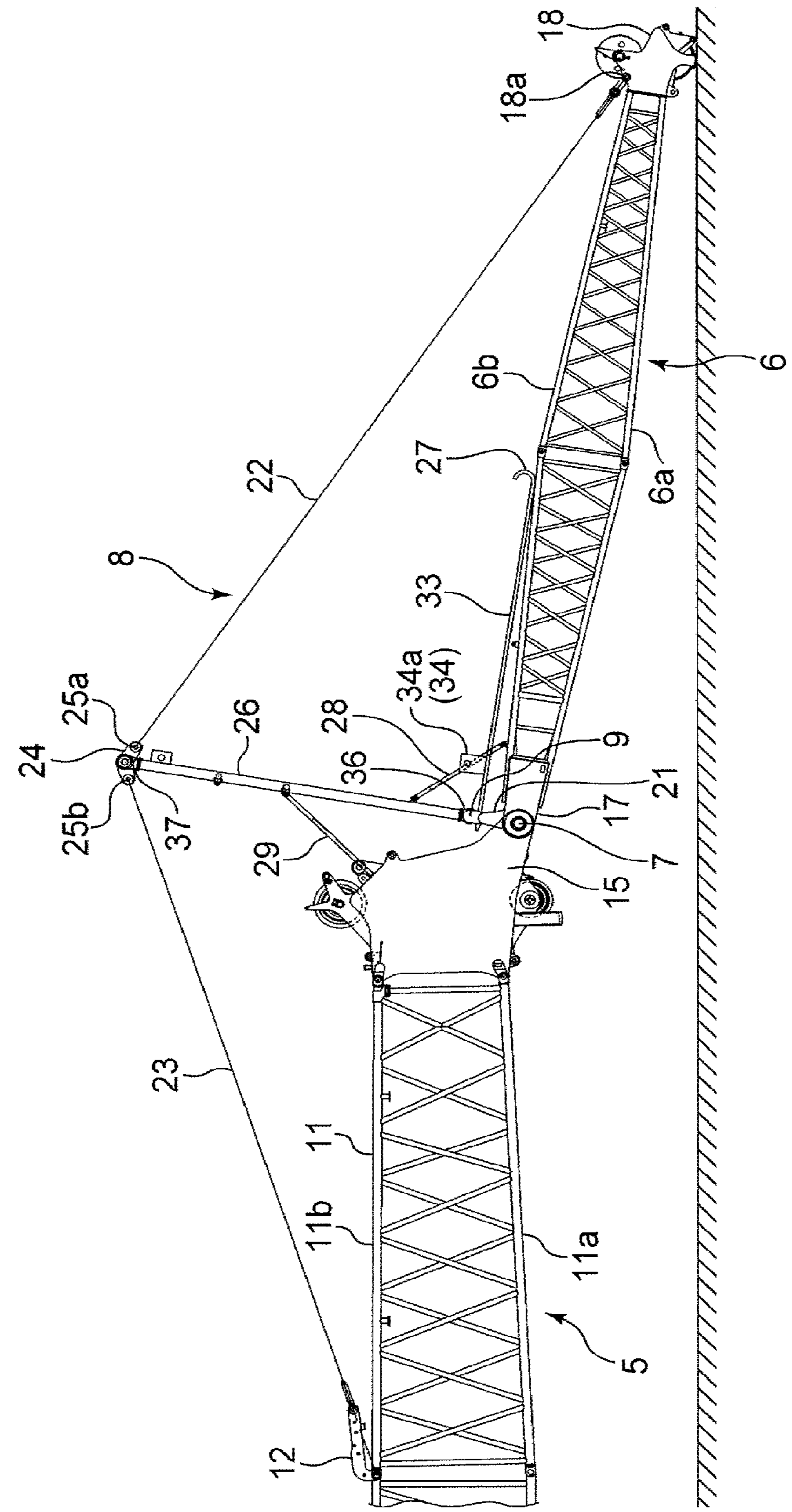
FIG. 5 is a side view showing a state where a derricking member of a crane according to the second embodiment is laid down and showing the step of assembling the derricking member and a jib posture retention device.

Besides, the mast posture retaining member 28 is used not only for retaining the jib mast 26 in the looseness-allowing lying posture but also as a stopper for preventing the jib mast 26 in the uprise posture from rotational movement in the direction to be laid along the jib 6. Specifically, as shown in FIGS. 1 and 5, the mast posture retaining member 28 is configured to be interposable between the jib mast 26 and the jib 6 so as to prevent the jib mast 26 in the uprise posture from frontward rotational movement about the jib-mast proximal end 36 (the support pin 9). When interposed between the jib mast 26 in the uprise posture and the jib 6, the mast posture retaining member 28 is placed in a posture of extending in a direction crossing respective axis directions of the jib mast 26 in the uprise posture and the jib 6, and one end of the mast posture retaining member 28 is connected to the jib mast 26 while the other end of the mast posture retaining member 28 is connected to the jib 6. Also in this case, the one end of the mast posture retaining member 28 is attachable to and detachable from the jib mast 26, and the other end of the mast posture retaining member 28 is attachable to and detachable from the jib mast 26. When the jib mast 26 is shifted from the uprise posture (the tension form) to the looseness-allowing lying posture (the looseness allowing form) or the storage lying posture (the storage form), the connection of the mast posture retaining member 28 to the jib mast 26 is released, and the mast posture retaining member 28 is located at a position where the mast posture retaining member 28 is unobstructive to the shift of the posture of the jib mast 26.

The mast posture retaining member 28 also serves as a jib back stop that prevents the jib 6 from backward rotational movement with the derricking member 3 in the uprise posture, when interposed between the jib mast 26 and the jib 6 as described above.

The jib-mast back stop 29 is provided to prevent the jib mast 26 in the uprise posture from rotational movement in a direction opposite to the direction to be laid along the jib 6. Specifically, the jib-mast back stop 29 is a rod-like member. The jib-mast back stop 29 is interposed between the jib mast 26 in the uprise posture and the boom distal end 15 so as to prevent the jib mast 26 from rotational movement in the above opposite direction about the jib-mast proximal end 36 (support pin 9). The jib mast 26 is configured to be retained in the uprise posture by prevention of the jib mast 26 from respective rotational movements to both front and rear sides of the jib mast 26 by the mast posture retaining member 28 and the jib-mast back stop 29. When interposed between the jib mast 26 and the boom distal end 15, the jib-mast back stop 29 is placed in a posture of extending in a direction crossing respective axis directions of the jib mast 26 in the uprise posture and the boom 5 (the axis direction of the boom body 11), and one end of the jib-mast back stop 29 in the longitudinal direction (extension direction) is connected to the jib mast 26 while the other end, which is the end opposite to the one end, is connected to the boom distal end 15. The one end of the jib-mast back stop 29 is attachable to and detachable from the jib mast 26, and the other end of the jib-mast back stop 29 is attachable to and detachable from the boom distal end 15. The jib-mast back stop 29 is configured to be removed from the jib mast 26 and the boom distal end 15 when the jib mast 26 is shifted from the uprise posture (the tension form) to the looseness-allowing lying posture (the looseness allowing form) or storage lying posture (the storage form).

The guide part 33 guides the jib-mast proximal end 36 from the uprising-proximal-end support part 21 to the lying-proximal-end holding part 27 when the jib mast 26 is shifted from the uprise posture to the looseness-allowing lying posture. Also, the guide part 33 guides the jib-mast proximal end 36 from the lying-proximal-end holding part 27 to the uprising-proximal-end support part 21 when the jib mast 26 is shifted from the looseness-allowing lying posture to the uprise posture. The guide part 33 is installed on the back surface **6*b* of the jib 6 so as to extend along the axis direction of the jib 6 between the uprising-proximal-end support part 21 and the lying-proximal-end holding part 27. One end of the guide part 33 reaches the uprising-proximal-end support part 21 while the other end of the guide part 33 reaches the lying-proximal-end holding part 27. The guide part 33 has an unillustrated recessed guide groove extending along the extension direction of the guide part 33. The jib-mast proximal end 36 is configured to be fitted into the guide groove slidably against the guide part 33 along the extension direction of the guide groove. The jib-mast proximal end 36 is, thus, guided from one of the uprising-proximal-end support part 21 and the lying-proximal-end holding part 27 to the other by the guide groove. This restrains the jib-mast proximal end 36** that is being guided by the guide groove from undesirable movement in the right-left direction.

Besides, as shown in FIG. 5, the guide part 33 is attached to the jib 6 in such a posture that the guide part 33 is down-sloped frontward when the jib 6 is laid down relatively to the boom 5 to the extent of bringing the jib distal end 18 into contact with the ground with the boom 5 laid down while rendering the jib-side support rope 22 linearly tensioned between the rope connection part 24 of the jib-mast distal end 37 and the jib-side rope connection place **18*a* of the jib distal end 18 and rendering the boom-side support rope 23 linearly tensioned between the rope connection part 24 of the jib-mast distal end 37 and the boom-side rope connection place 12**.

As shown in FIG. 2, the storage holding part 34 is provided to hold the jib mast 26 that is being in the storage lying posture. The storage holding part 34 is provided in the guide part 33 at a position between the lying-proximal-end holding part 27 and the uprising-proximal-end support part 21. In the first embodiment, the storage holding part 34 may be attached to a member constituting the jib 6 (e.g., a diagonal member constituting the lattice structure on the back-surface-**6*b* side of the jib 6, etc.). The storage holding part 34 holds a part of the jib mast 26 that is being in the storage lying posture, the part being between the jib-mast distal end 37 and the jib-mast proximal end 36. By the hold of the part between the jib-mast distal end 37 and the jib-mast proximal end 36 in the jib mast 26 being in the storage lying posture by the storage holding part 34, the hold of the jib-mast proximal end 36 by the lying-proximal-end holding part 27 and further the hold of the rope connection part 24 by the uprising-proximal-end support part 21, the jib mast 26** is retained in the storage lying posture.

The storage holding part 34 includes a pair of holding-part side plate parts **34*a* which are distributed to both sides of the jib proximal end 17 in a direction parallel to the rotation axis of the jib proximal end 17 with the jib mast 26 in the storage lying posture. Each drawing shows only one holding-part side plate part 34*a* of the pair of holding-part side plate parts 34*a*, the one holding-part side plate part 34*a* located on the front side of the paper surface in the drawing. The pair of holding-part side plate parts 34*a* have respective projections that project upward beyond the jib mast 26 that is being in the storage lying posture. The projection of each of the holding-part side plate parts 34*a* is provided with a through-hole allowing the support pin 9 to be fitted into the through-hole. The jib mast 26 being in the storage lying posture is placed between the pair of holding-part side plate parts 34*a*, allowing the support pins 9 to be through the through-holes of the pair of holding-part side plate parts 34*a*. The jib mast 26 is thus prevented from displacement in a direction parallel to the rotation axis of the jib proximal end 17, by the pair of holding-part side plate parts 34*a*, and prevented from upward movement by the support pin 9, whereby the jib mast 26 is held. The support pin 9 is extractable from the through-holes of the pair of holding-part side plate parts 34*a* to be removed from the storage holding part 34. For the shift of the jib mast 26 from the storage lying posture to the other posture, the support pin 9 is removed from the storage holding part 34 to allow the jib mast 26 to be separated from the storage holding part 34. As the support pin 9 used for holding the jib mast 26, in the storage holding part 34, utilized is the support pin 9 for supporting the jib-mast proximal end 36 in the uprising-proximal-end support part 21**.

Besides, at a position between the uprising-proximal-end support part 21 and the storage holding part 34 in the guide part 33, an unillustrated locking part is provided to be connected to the rope connection part 24 of the jib-mast distal end 37 in the jib mast 26 that is being in the storage lying posture to thereby lock the rope connection part 24.

The crane 100 according to the first embodiment, as shown in FIG. 1, further includes the cab 38, the counterweight 39, a boom derricking device 40, a boom back stop 41, a main winding winch 42, a main hook 43, an auxiliary winding winch 44, and an auxiliary hook 45.

The cab 38 is a part allowing an operator to perform therein the manipulation of the crane 100. The cab 38 is provided in the frontmost part of the turning body 2 and sideward of the boom proximal end 14. In the cab 38 are provided respective operation levers for instructing drives of the main winding winch 42 and the auxiliary winding winch 44.

The counterweight 39 is a weight for securing the stability of the crane 100. The counterweight 39 is mounted on the rearmost part of the turning body 2.

The boom derricking device 40 is a device for derricking the boom 5. The boom derricking device 40 includes a boom mast 47, a pendant rope 48, a mast-side sheave 49, an unillustrated turning-body side sheave, and an unillustrated derricking winch.

The boom mast 47 is used for derricking the boom 5. The boom mast 47 is disposed backward of the boom 5. The boom mast 47 is attached to the turning body 2 rotatably about an axis parallel to the rotation axis of the boom 5 (the rotation axis of the boom proximal end 14). Specifically, the boom mast 47 has a boom-mast proximal end 52, which is one end in the longitudinal direction thereof, and a boom-mast distal end 54 opposite to the boom-mast proximal end 52. The boom-mast proximal end 52 is attached to the turning body 2 rotatably about an axis parallel to the rotation axis of the boom 5.

The pendant rope 48 interconnects the boom-mast distal end 54 and the boom distal end 15. The boom distal end 15 is, thus, connected to the boom-mast distal end 54 through the pendant rope 48.

The mast-side sheave 49 is attached to the boom-mast distal end 54 rotatably about an axis extending in the right-left direction of the turning body 2.

The unillustrated turning-body side sheave is attached to the rear end of the turning body 2 rotatably about an axis extending in the right-left direction of the turning body 2.

The unillustrated derricking winch is mounted on the turning body 2. The derricking winch performs winding and unwinding the derricking rope 56 to thereby derrick the boom 5. The derricking winch includes an unillustrated derricking drum around which the derricking rope 56 is wound. The derricking rope 56 is drawn from the derricking drum and placed around the mast-side sheave 49 and the turning-body side sheave. The derricking winch makes normal rotation of the derricking drum to wind the derricking rope 56 to thereby pull the mast-side sheave 49 toward the unillustrated turning-body side sheave to rotationally move the boom mast 47 backward, causing the boom mast 47 to draw the boom distal end 15 backward through the pendant rope 48 to raise the boom 5. On the other hand, the derricking winch makes reverse rotation of the derricking drum to draw out the derricking rope 56 to thereby allow the boom mast 47 to rotationally move frontward, causing the boom 5 to fall down while the boom mast 47 supports the boom distal end 15 through the pendant rope 48.

The boom back stop 41 is provided to prevent the boom 5 from backward rotational movement beyond a predetermined uprise angle. The boom back stop 41 is connected to the back surface 11*b* of the boom body 11 at a position separate from the boom proximal end 14 toward the boom distal end 15 by a predetermined distance.

The main winding winch 42 performs winding and unwinding of the main winding rope 58 to thereby hoist and lower the main hook 43. The main winding winch 42 is mounted on the turning body 2. The main winding winch 42 includes a main winding drum 42*a* around which the main winding rope 58 is wound. The main winding rope 58 is drawn from the main winding drum 42*a* to reach the boom distal end 15, and suspends the main hook 43 from the boom distal end 15. The main winding winch 42 makes normal rotation of the main winding drum 42*a* to wind the main winding rope 58, thereby hoisting the main hook 43. On the other hand, the main winding winch 42 makes reverse rotation of the main winding drum 42*a* to draw out the main winding rope 58, thereby lowering the main hook 43. The main winding winch 42 is configured to be driven in response to the operation applied to a corresponding operation lever provided in the cab 38.

The auxiliary winding winch 44 performs winding and unwinding of the auxiliary winding rope 60 to thereby hoist and lower the auxiliary hook 45. The auxiliary winding winch 44 is mounted on the turning body 2. The auxiliary winding winch 44 includes an auxiliary winding drum 44*a* around which the auxiliary winding rope 60 is wound. The auxiliary winding rope 60 is drawn from the auxiliary winding drum 44*a* to reach the jib distal end 18, and suspends the auxiliary hook 45 from the boom distal end 15. The auxiliary winding winch 44 makes normal rotation of the auxiliary winding drum 44*a* to wind the auxiliary winding rope 60, thereby hoisting the auxiliary hook 45. On the other hand, the auxiliary winding winch 44 makes reverse rotation of the auxiliary winding drum 44*a* to draw out the auxiliary winding rope 60, thereby lowering the auxiliary hook 45. The auxiliary winding winch 44 is configured to be driven in response to the operation applied to a corresponding operation lever provided in the cab 38.

Next will be described a method of assembling the crane 100 according to the first embodiment.

The crane 100 is transported in a state of being disassembled into components of the traveling body 1, the turning body 2, the boom 5 and the jib 6 and the like, and thereafter assembled of the thus transported components, at the work site. In this assembly, the turning body 2 is mounted on the traveling body 1, and the boom 5 is connected to the turning body 2. At this time, the boom 5 is laid down so as to extend frontward from the turning body 2 along the ground, and the boom proximal end 14 is connected to the front end of the turning body 2. Meanwhile, the boom distal end 15 is placed on a boom distal end support 104 on the ground.

Next, the jib 6 is connected to the boom distal end 15. At this time, the jib 6 is laid down so as to extend frontward from the boom distal end 15 along the ground as shown in FIG. 2, and the jib proximal end 17 is connected to the boom distal end 15. Meanwhile, the jib distal end 18 is placed on a jib distal end support 102 on the ground. To the jib 6 is fixed the jib mast 26 in the storage lying posture (the storage form).

Next, the support pin 9 that has been holding the jib mast 26 in the storage holding part 34 is removed from the storage holding part 34. Besides, the engagement between the rope connection part 24 of the jib-mast distal end 37 and the unillustrated locking part provided in the guide part 33 is released. The fixing of the jib mast 26 in the storage holding part 34 is thereby released.

The jib-mast distal end 37 is, thereafter, moved to the looseness allowing position (see FIG. 3). Specifically, the jib-mast distal end 37 is suspended up to the looseness allowing position by an unillustrated auxiliary crane. By the lift-up suspension of the jib-mast distal end 37, the jib mast 26 is rotationally moved upward with the jib-mast proximal end 36 as a fulcrum to be shifted to the looseness-allowing lying posture (the looseness allowing form) while the jib-mast proximal end 36 is kept held by the lying-proximal-end holding part 27. The rope connection part 24 is thereby located at the looseness allowing form position.

Next, the jib mast 26 is fixed in the looseness-allowing lying posture. Specifically, the mast posture retaining member 28 which had been fixed to the jib 6 in a posture of lying down along the back surface 6*b* of the jib 6 is raised and interposed between the back surface 6*b* of the jib 6 and the jib mast 26 in the looseness-allowing lying posture. At this time, the distal end of the thus raised mast posture retaining member 28 is connected to a predetermined part of the jib mast 26.

Next, the jib-side support rope 22 is installed between the jib-side rope connection place 18*a* of the jib distal end 18 and the rope connection part 24 provided at the jib-mast distal end 37, and the boom-side support rope 23 is installed between the boom-side rope connection place 12 of the boom 5 and the rope connection part 24 of the jib-mast distal end 37. Specifically, one end of the jib-side support rope 22 is connected to the jib-side rope connection place 18*a* through the unillustrated connection pin, and the other end of the jib-side support rope 22 is connected to the rope connection part 24 through the connection pin 25*a*. Besides, one end of the boom-side support rope 23 is connected to the boom-side rope connection place 12 through the unillustrated connection pill, and the other end of the boom-side support rope 23 is connected to the rope connection part 24 through the connection pin 25*b*. The thus installed jib-side support rope 22 and boom-side support rope 23 are in looseness state.

Figure 4:
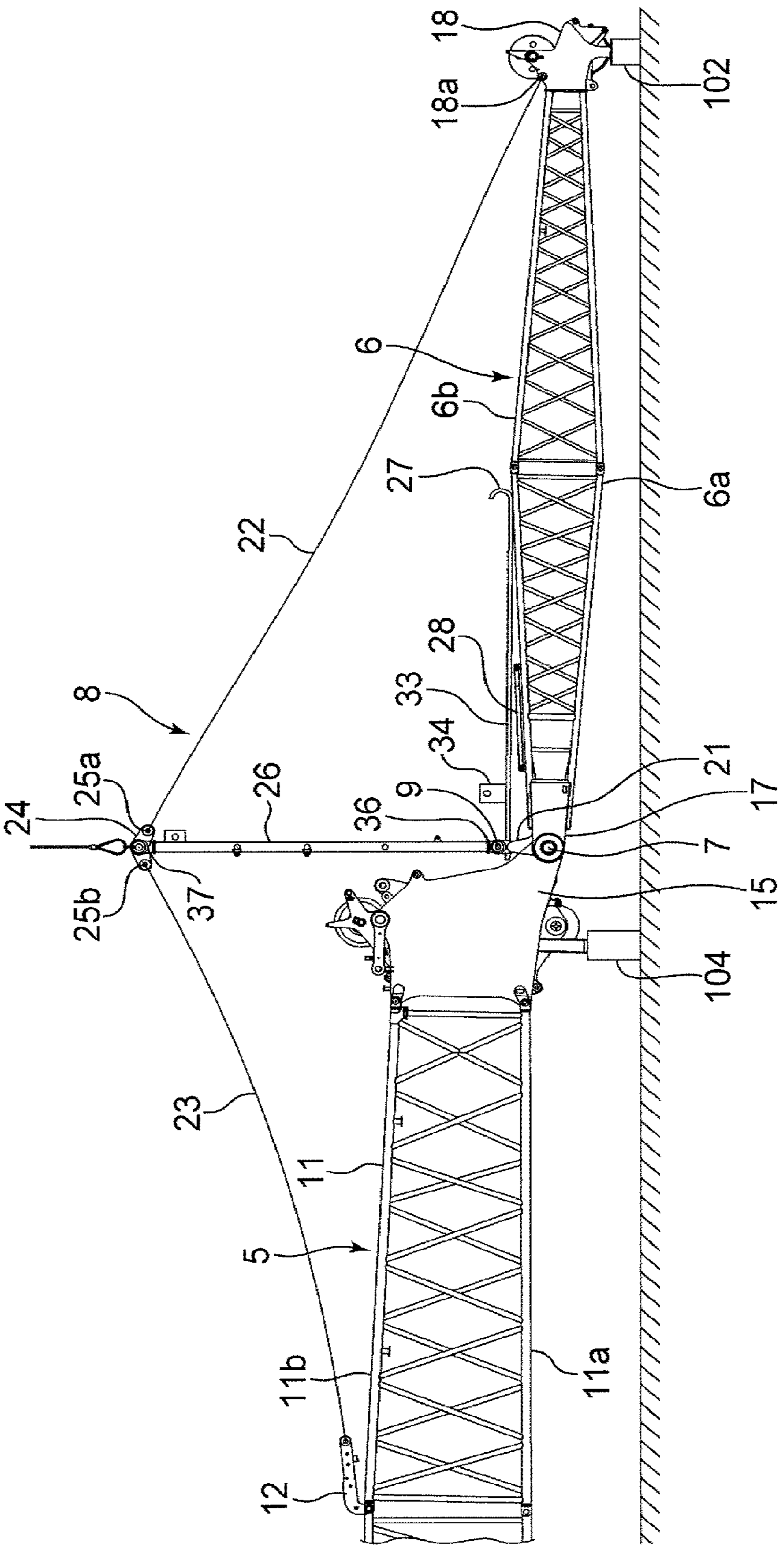
FIG. 4 is a side view showing a state where the derricking member of the crane according to the first embodiment is laid down and showing the step of assembling the derricking member and the jib posture retention device.

Next, the jib mast 26 is raised from the looseness-allowing lying posture. Specifically, the connection of the distal end of the mast posture retaining member 28 to the jib mast 26 is released and the mast posture retaining member 28 is laid down along the back surface 6*b* of the jib 6, after which the jib-mast distal end 37 is suspended up from the looseness allowing position by the auxiliary crane. The upward suspension of the jib-mast distal end 37 involves the movement of the jib-mast proximal end 36 from the lying-proximal-end holding part 27 to the uprising-proximal-end support part 21 with the guide of the jib-mast proximal end 36 by the guide part 33 and rotational movement of the jib mast 26 upward with the jib-mast proximal end 36 as a fulcrum from the looseness-allowing lying posture. The jib mast 26 is thereby raised as shown in FIG. 4. The jib-mast proximal end 36 is then attached to the uprising-proximal-end support part 21 through the support pin 9 that has been removed from the storage holding part 34 for the above-described release of the fixing of the jib mast 26 in the storage lying posture.

Thereafter, the jib distal end support 102 is brought out from below the jib distal end 18 to make the jib distal end 18 touch down on the ground, and the boom 5 is rotationally moved upward to reach the predetermined frontward tilt posture relative to the boom 5. In other words, the boom 5 is rotationally moved upward to the extent of rendering the jib-side support rope 22 linearly tensioned between the rope connection part 24 and the jib-side rope connection place 18*a* and rendering the boom-side support rope 23 linearly tensioned between the rope connection part 24 and the boom-side rope connection place 12. This brings the jib mast 26 into the uprise posture (the tension form), and locates the rope connection part 24 at the tensioning position, as shown in FIG. 5.

Next, the jib mast 26 is fixed in the uprise posture. Specifically, the mast posture retaining member 28 is raised and interposed between the back surface 6*b* of the jib 6 and the jib mast 26 to prevent the jib mast 26 from frontward rotational movement (movement in the direction to be laid along the jib 6), and the jib-mast back stop 29 is interposed between the boom distal end 15 and the jib mast 26 to prevent the jib mast 26 from backward rotational movement (the rotational movement in the opposite direction to the direction to be laid along the jib 6); thus, the jib mast 26 is fixed in the uprise posture.

Thereafter, the main winding rope 58 is drawn from the main winding drum 42*a* of the main winding winch 42 mounted on the turning body 2 and routed so as to reach the boom distal end 15, and the main hook 43 is attached to the main winding rope 58 to be suspended from the boom distal end 15. Besides, the auxiliary winding rope 60 is drawn from the auxiliary winding drum 44*a* of the auxiliary winding winch 44 mounted on the turning body 2 and routed so as to reach the jib distal end 18, and the auxiliary hook 45 is attached to the auxiliary winding rope 60 so as to be suspended from the jib distal end 18. Finally, the boom 5 is raised by the boom derricking device 40 as shown in FIG. 1.

Thus, the crane 100 according to the first embodiment is assembled.

Next will be described a method of disassembling the crane 100 according to the first embodiment.

From the uprise posture as shown in FIG. 1, initially, the boom 5 of the crane 100 is laid down frontward to the extent of bring the jib distal end 18 into contact with the ground. Thereafter, the main winding rope 58 and the main hook 43 and the like are removed from the boom 5, and the auxiliary winding rope 60 and the auxiliary hook 45 are removed from the jib 6.

Next, the prevention of the jib mast 26 from the frontward rotational movement by the mast posture retaining member 28 is released and the prevention of the jib mast 26 from backward rotational movement by the jib-mast back stop 29 is also released. Specifically, the jib-mast distal end 37 is suspended and supported by the auxiliary crane, in which state the connection of one end of the mast posture retaining member 28 interposed between the jib mast 26 and the jib 6 to the jib mast 26 is released, and the mast posture retaining member 28 is placed at a position to be unobstructive to the shift of the mast posture retaining member 28 from the uprise posture to the looseness-allowing lying posture. In the same state, the mast back stop 29 interposed between the jib mast 26 and the boom distal end 15 is removed from the jib mast 26 and the boom distal end 15.

Subsequently, the jib mast 26 is rendered in the looseness-allowing lying posture with the boom 5 and the jib 6 in the posture shown in FIG. 5. The looseness-allowing lying posture in which the jib mast 26 is rendered is a posture where the jib mast 26 is laid down with respect to the boom 5 and jib 6, which are being in the posture shown in FIG. 5, similarly to the jib mast 26 shown in FIG. 3. In other words, the looseness-allowing lying posture is a posture in which the jib-mast distal end 37 is located closer to the boom distal end 15 than the jib-mast proximal end 36 and the jib-mast proximal end 36 is located closer to the jib distal end 18 than the jib-mast distal end 37 to allow the jib-mast proximal end 36 to be held by the lying-proximal-end holding part 27 and to locate the rope connection part 24 at the looseness allowing position, while the boom 5 and the jib 6 are in the posture shown in FIG. 5. For laying down the jib mast 26 to the looseness-allowing lying posture, specifically, the support pin 9 is extracted from the through-hole of the jib-mast proximal end 36 and the through-hole of the uprising-proximal-end support part 21 to release the connection of the jib-mast proximal end 36 to the uprising-proximal-end support part 21 with the jib-mast distal end 37 suspended and supported by an auxiliary crane, and, thereafter, the jib-mast distal end 37 is moved to the looseness allowing position while being suspended and supported by the auxiliary crane. This causes the jib-mast proximal end 36 to be moved frontward along the slope of the guide part 33 shown in FIG. 5 to reach the lying-proximal-end holding part 27, and causes the jib mast 26 to fall down from the uprise posture to be shifted to the looseness-allowing lying posture. By the shift of the jib mast 26 to the looseness-allowing lying posture, the jib-side support rope 22 and the boom-side support rope 23 are largely loosened.

In the state where the jib mast 26 is thus rendered in the looseness-allowing lying posture, the mast posture retaining member 28 is interposed between the back surface 6*b* of the jib 6 and the jib mast 26 to fix the posture of the jib mast 26.

Next, the jib-side support rope 22 is removed from the jib-side rope connection place 18*a* of the jib distal end 18 and the rope connection part 24 provided in the jib-mast distal end 37, and the boom-side support rope 23 is removed from the boom-side rope connection place 12 of the boom 5 and the rope connection part 24 of the jib-mast distal end 37. Specifically, the unillustrated connection pin that has been interconnecting one end of the jib-side support rope 22 and the jib-side rope connection place 18*a* is removed and the connection pin 25*a* that has been interconnecting the other end of the jib-side support rope 22 and the rope connection part 24 is removed, and the unillustrated connection pin that has been interconnecting one end of the boom-side support rope 23 and the boom-side rope connection place 12 is removed and the connection pin 25*b* that has been interconnecting the other end of the boom-side support rope 23 and the rope connection part 24 is removed.

Thereafter, the fixing of the jib mast 26 in the looseness-allowing lying posture by the mast posture retaining member 28 is released. Specifically, the connection of one end of the mast posture retaining member 28 interposed between the back surface 6*b* of the jib 6 and the jib mast 26 to the jib mast 26 is released, and the mast posture retaining member 28 is placed at a position where the mast posture retaining member 28 is unobstructive to the further fall of the jib mast 26, specifically, at a position to be laid along the back surface 6*b* of the jib 6, and fixed to the jib 6.

Thereafter, the jib-mast distal end 37 is further lowered from the looseness allowing position while being suspended and supported by the auxiliary crane. The jib mast 26 is thereby rotationally moved downward with the jib-mast proximal end 36 as a fulcrum to be shifted to the storage lying posture (the storage form) in which the jib mast 26 is laid along the jib 6, while the jib-mast proximal end 36 is kept held by the lying-proximal-end holding part 27.

Thereafter, the jib mast 26 is held by the storage holding part 34 and the support pin 9 while the rope connection part 24 of the jib-mast distal end 37 is connected to the unillustrated locking part provided in the guide part 33, the jib mast 26 thereby being fixed in the storage lying posture.

Next, the boom 5 is made further fall down to be laid along the ground, and the jib 6 is placed so as to extend from the boom distal end 15 in the same direction as the extension direction of the boom 5. Then, the jib distal end support 102 is interposed between the jib distal end 18 and the ground, and the boom distal end support 104 is interposed between the boom distal end 15 and the ground. Thereby generate is the state shown in FIG. 2.

Thereafter, the connection of the jib 6 to the boom distal end 15 by the jib connection pin 7 is released, and the connection of the boom 5 to the turning body 2 is released.

Thus, the crane 100 according to the first embodiment is disassembled.

In the crane 100 according to the first embodiment, the jib mast 26 can be rendered in the looseness-allowing lying posture (the looseness allowing form) of locating the rope connection part 24 at the looseness allowing position that is closer to the boom distal end 15 and the jib proximal end 17 than the tensioning position, making the distance to the rope connection part 24 from the jib-side rope connection place 18*a* of the jib distal end 18 smaller than the length of the jib-side support rope 22 and making the distance to the rope connection part 24 from the boom-side rope connection place 12 smaller than the length of the boom-side support rope 23. Hence, by rendering the jib mast 26 in the looseness-allowing lying posture with the boom 5 and the jib 6 laid down to locate the rope connection part 24 at the looseness allowing position, the height position of the rope connection part 24 located at the looseness allowing position from the ground is allowed to be reduced, as compared with the height position from the ground in the assumed case where the rope connection part 24 is located at the tensioning position, and the rope connection part 24 is allowed to be close to the jib distal end 18 with a distance smaller than the length of the jib-side support rope 22 and to be close to the boom-side rope connection place 12 with a distance smaller than the length of the boom-side support rope 23.

When the crane 100 is assembled, therefore, the jib-side support rope 22 connected to the rope connection part 24 located at the looseness allowing position and suspended from the rope connection part 24 is restrained from approaching the rope connection part 24 to go away from the jib distal end 18. This enables the jib-side support rope 22 to be connected to the jib-side rope connection place 18*a* of the jib distal end 18 without operation of drawing the jib-side support rope 22 toward the jib distal end 18. Besides, the boom-side support rope 23 connected to the rope connection part 24 located at the looseness allowing position and suspended from the rope connection part 24 is also restrained from approaching the rope connection part 24 to go away from the boom-side rope connection place 12. This enables the boom-side support rope 23 to be connected to the boom-side rope connection place 12 without operation of drawing the boom-side support rope 23 toward the boom-side rope connection place 12. Thus, the burden of a worker can be reduced in the work of installing the jib-side support rope 22 between the rope connection part 24 provided at the jib-mast distal end 37 and the jib distal end 18 and the work of installing the boom-side support rope 23 between the rope connection part 24 provided at the jib-mast distal end 37 and the boom-side rope connection place 12.

Besides, when the jib-side support rope 22 and the boom-side support rope 23 installed as described above are removed for disassembly of the crane 100, the shift of the jib mast 26 to the looseness allowing fall-down posture enables the rope connection part 24 to be close to the jib-side rope connection place 18*a* of the jib distal end 18 with a distance smaller than the length of the jib-side support rope 22 to thereby release the tension on the jib-side support rope 22 and enables the rope connection part 24 to be close to the boom-side rope connection place 12 with a distance smaller than the length of the boom-side support rope 23 to thereby release the tension on the boom-side support rope 23. In this state, the jib-side support rope 22 is prevented from applying a large tension to the unillustrated connection pin that connects one end of the jib-side support rope 22 to the jib-side rope connection place 18*a* and the connection pin 25*a* that connects the other end of the jib-side support rope 22 to the rope connection part 24, and the boom-side support rope 23 is prevented from applying a large tension to the unillustrated connection pin that connects one end of the boom-side support rope 23 to the boom-side rope connection place 12 and the connection pin 25*b* that connects the other end of the boom-side support rope 23 to the rope connection part 24. This enables a worker to facilely release the connection of the one end of the jib-side support rope 22 to the jib-side rope connection place 18*a* without operation of pulling the jib-side support rope 22 toward the jib-side rope connection place 18*a* against a large tension on the jib-side support rope 22 and to facilely release the connection of the one end of the jib-side support rope 22 to the rope connection part 24 without operation of pulling the jib-side support rope 22 toward the rope connection part 24 against a large tension on the jib-side support rope 22. Besides, a worker is also enabled to facilely release the connection of the one end of the boom-side support rope 23 to the boom-side rope connection place 12 without pulling the boom-side support rope 23 toward the boom-side rope connection place 12 against a large tension on the boom-side support rope 23 and to facilely release the connection of the other end of the boom-side support rope 23 to the rope connection part 24 without pulling the boom-side support rope 23 toward the rope connection part 24 against a large tension on the boom-side support rope 23. Thus, the burden on a worker is reduced in the work of removing the jib-side support rope 22 having been installed between the rope connection part 24 and the jib distal end 18 and the work of removing the boom-side support rope 23 having been installed between the rope connection part 24 and the boom-side rope connection place 12.

In addition, the height position of the rope connection part 24 from the ground can be reduced by rendering the jib mast 26 in the looseness-allowing lying posture to locate the rope connection part 24 at the looseness allowing position while the boom 5 and the jib 6 are laid down. This allows the work of connecting the jib-side support rope 22 and the boom-side support rope 23 to the rope connection part 24, for the assembly of the crane 100, to be performed at a relatively low location, and allows the work of releasing the connection of each of the jib-side support rope 22 and the boom-side support rope 23 to the rope connection part 24, for the disassembly of the crane 100, to be performed at a relatively low location. These also can reduce the burden on a worker in the work of installing the jib-side support rope 22 and the boom-side support rope 23 and the work of removing the thus installed jib-side support rope 22 and the boom-side support rope 23.

Besides, the first embodiment, where the jib posture retention device 8 includes the guide part 33, which guides the movement of the jib-mast proximal end 36 from one of the uprising-proximal-end support part 21 and the lying-proximal-end holding part 27 to the other thereof when the jib mast 26 is shifted from one of the uprise posture and the looseness-allowing lying posture to the other, allows the shift of the jib mast 26 from one of the uprise posture and the looseness-allowing lying posture to the other to be smoothly performed.

Besides, the guide part 33 is attached to the jib 6 in such a posture that the guide part 33 is down-sloped frontward when the boom 5 is laid down and the jib 6 is laid down with respect to the boom 5 to the extent of bringing the jib distal end 18 into contact with the ground, rendering the jib-side support rope 22 linearly tensioned between the rope connection part 24 and the jib-side rope connection place 18*a* of the jib distal end 18 and rendering the boom-side support rope 23 linearly tensioned between the rope connection part 24 and the boom-side rope connection place 12. This enables the jib-mast proximal end 36 to be naturally moved from the uprising-proximal-end support part 21 frontward to the lying-proximal-end holding part 27 along the slope of the guide part 33 by the self-weight of the jib mast 26, during the operation of making the jib mast 26 fall down from the uprise posture while suspending and supporting the jib mast 26 by an auxiliary crane so as to loosen the jib-side support rope 22 and the boom-side support rope 23 which had been linearly tensioned, in the state where the boom 5 is laid down and the jib 6 is laid down with respect to the jib 6 so as to bring the jib distal end 18 into contact with the ground for the disassembly of the crane 100. The jib mast 26, thus, can be naturally shifted to the looseness-allowing lying posture. This allows the burden to be reduced on a worker involved in the operation of moving the jib mast 26 from the uprise posture to the looseness-allowing lying posture.

Besides, in the first embodiment, the jib posture retention device 8 includes the mast posture retaining member 28 to be interposed between the jib mast 26 and the jib 6 to retain the posture of the jib mast 26 that is being in the looseness-allowing lying posture where the jib mast 26 is inclined to the axis direction of the jib 6 so that the jib mast 26 is gradually separated from the jib 6 backward of the jib 6 as it goes from the jib-mast proximal end 36 to the jib-mast distal end 37. Thus interposing the mast posture retaining member 28 between the jib mast 26 that is being in the looseness-allowing lying posture and the jib 6, therefore, enables the jib mast 26 to be retained more stably in the looseness-allowing lying posture than the case where the jib mast 26 is retained in the looseness-allowing lying posture only by the suspension of the jib-mast distal end 37 by an auxiliary crane or the like.

Besides, the mast posture retaining member 28 is configured to be interposable between the jib mast 26 and the jib 6 to prevent the jib mast 26 in the uprise posture from frontward rotational movement about the jib-mast proximal end 36 (support pin 9). This allows the mast posture retaining member 28 to be used for not only retaining the jib mast 26 in the looseness-allowing lying posture but also retaining the jib mast 26 in the uprise posture. Thus can be reduced the number of members required both to retain the jib mast 26 in the looseness-allowing lying posture and to retain the jib mast 26 in the uprise posture, and can be thereby reduced the manufacturing cost of the crane 100.

Second Embodiment

Next will be described a configuration of a crane 100 according to a second embodiment of the present invention with reference to FIGS. 6 to 9.

The crane 100 according to the second embodiment differs from the crane 100 according to the first embodiment in the configuration of the jib mast 26. The jib mast 26 in the second embodiment is configured to be shiftable from one of the tensioning form and looseness allowing form to the other thereof, by expansion and contraction of the jib mast 26.

Specifically, the jib mast 26, in the second embodiment, includes a lower mast member 62 and an upper mast member 63.

The lower mast member 62 is attached to the jib proximal end 17 rotatably about an axis parallel to the rotational axis of the jib 6 (the rotation axis of the jib proximal end 17). Specifically, the lower mast member 62 has a linearly extending tube-shape, and one end of the lower mast member 62, namely, a jib-mast proximal end 36, is attached to the jib proximal end 17 through an uprising-proximal-end support part 21. The proximal end of the lower mast member 62 is attached by a support pin 9 in the same manner as the attachment of the jib-mast proximal end 36 to the uprising-proximal-end support part 21 in the first embodiment.

Figure 7:
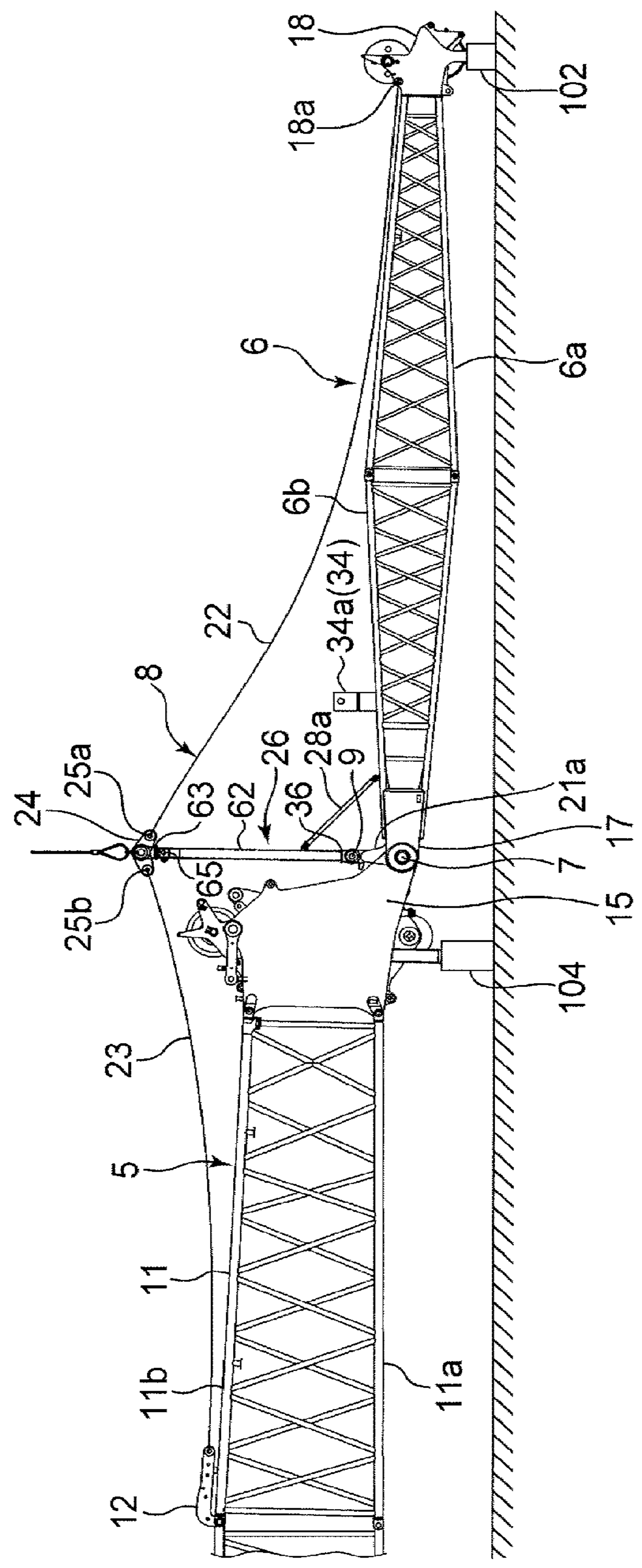
FIG. 7 is a side view showing a state where the derricking member of the crane according to the second embodiment is laid down and showing the step of assembling the derricking member and the jib posture retention device.
Figure 8:
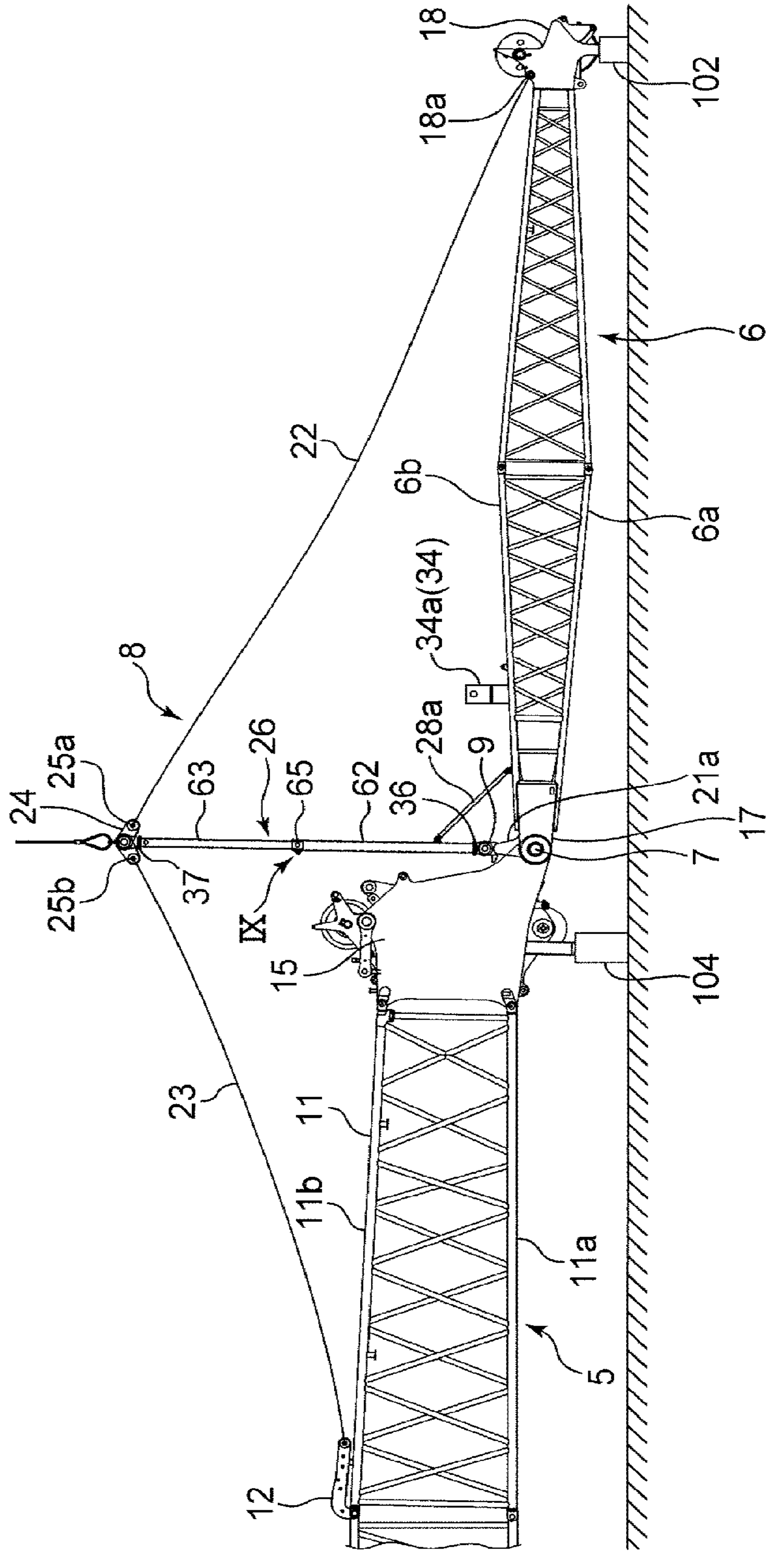
FIG. 8 is a side view showing a state where the derricking member of the crane according to the second embodiment is laid down and showing the step of assembling the derricking member and the jib posture retention device.
Figure 9:
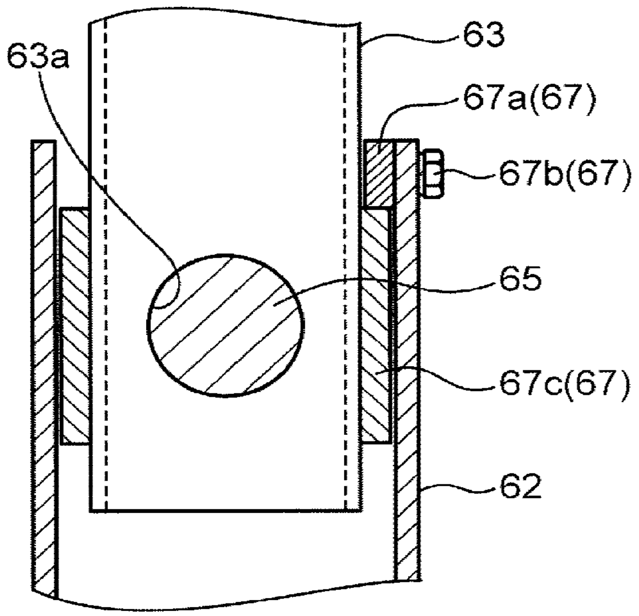
FIG. 9 is a view showing the enlarged cross section of the IX part of the jib mast shown in FIG. 8 along the axis direction of the jib mast.

The upper mast member 63 is attached to the lower mast member 62 so as to be protrusible and retractable with respect to the lower mast member 62 between a protrusion position shown in FIG. 8 and a retraction position shown in FIG. 7 when the jib mast 26 is in the uprise posture.

Specifically, the upper mast member 63 has a linearly extending tube-shape. The upper mast member 63 is inserted into the lower mast member 62 so as to be movable along the axis direction (extension direction) thereof relatively to the lower mast member 62. The end of the upper mast member 63 on the protrusion side from the lower mast member 62 out of opposite ends in the axis direction (extension direction) of the upper mast member 63 serves as a jib-mast distal end 37. To the jib-mast distal end 37 is attached a rope connection part 24 similarly to the first embodiment.

The upper mast member 63 locates the rope connection part 24 at the tensioning position when protruded from the inside of the lower mast member 62 to be located at the protrusion position shown in FIG. 8. Besides, the upper mast member 63 locates the rope connection part 24 at the looseness allowing position when retracted into the lower mast member 62 to be located at the retraction position shown in FIG. 7. The tensioning form of the jib mast 26 in the second embodiment is, thus, a state where the upper mast member 63 is protruded to the protrusion position where the upper mast member 63 is located at the tensioning position, from the lower mast member 62 in a posture of extending from the jib proximal end 17 backward of the jib proximal end 17. Besides, the looseness allowing form of the jib mast 26 is a state where the upper mast member 63 is retracted into the lower mast member 62 in a posture of extending from the jib proximal end 17 backward of the jib proximal end 17, to the retraction position where the rope connection part 24 is located at the looseness allowing position.

The jib mast 26 in the second embodiment includes a position fixing pin 65 (see FIG. 9) for fixing the upper mast member 63 to the lower mast member 62 at the protrusion position when the upper mast member 63 is protruded to the protrusion position. The position fixing pin 65 is an example of a position fixing member according to the present invention.

In the vicinity of the end of the upper mast member 63 opposite to the end on the protrusion side, a through-hole 63*a* is provided to allow the position fixing pin 65 to be fitted thereinto. Besides, in the vicinity of the end of the lower mast member 62 opposite to the end forming the jib-mast proximal end 36, an unillustrated through-hole is provided to allow the position fixing pin 65 to be fitted thereinto. The through-hole 63*a* of the upper mast member 63 is provided at a position where the through-hole 63*a* is aligned with the through-hole of the lower mast member 62 when the upper mast member 63 is located at the protrusion position. The position fixing pin 65 is fitted into the through-hole of the lower mast member 62 and the through-hole 63*a* of the upper mast member 63 when the upper mast member 63 is located at the protrusion position, thereby fixing the upper mast member 63 to the lower mast member 62 at the protrusion position. The fixing of the upper mast member 63 to the lower mast member 62 is released by extraction of the position fixing pin 65 from the through-hole of the lower mast member 62 and the through-hole 63*a* of the upper mast member 63, allowing the upper mast member 63 to be moved from the protrusion position to the retraction position.

The position fixing pin 65 is also used for fixing the upper mast member 63 to the lower mast member 62 at the retraction position when the upper mast member 63 is retracted into the retraction position. Specifically, in the vicinity of the end of the upper mast member 63 on the protrusion side, an unillustrated through-hole is provided to allow the position fixing pin 65 to be fitted thereinto. The through-hole in the vicinity of the end of the upper mast member 63 on the protrusion side is provided at a position to be aligned with the through-hole of the lower mast member 62 when the upper mast member 63 is located at the retraction position. The position fixing pin 65 is fitted into the through-hole of the lower mast member 62 and the through-hole in the vicinity of the end of the upper mast member 63 on the protrusion side when the upper mast member 63 is located at the retraction position, thereby fixing the upper mast member 63 to the lower mast member 62 at the retraction position. The fixing of the upper mast member 63 to the lower mast member 62 is released by the extraction of the position fixing pin 65 from the through-hole of the lower mast member 62 and the through-hole in the vicinity of the end of the upper mast member 63 on the protrusion side, allowing the upper mast member 63 to be moved from the retraction position to the protrusion position.

The jib mast 26 according to the second embodiment further includes a protrusion prevention unit 67 (see FIG. 9) that prevents the upper mast member 63 from being protruded from the lower mast member 62 beyond the protrusion position. The protrusion prevention unit 67 includes a stopper 67*a*, a mounting bolt 67*b*, and an abutment part 67*c*.

The stopper 67*a* is disposed inside the end of the lower mast member 62 opposite to the end forming the jib-mast proximal end 36, and fixed to the lower mast member 62 by the mounting bolt 67*b*. The abutment part 67*c* is fixed to the outer surface of the upper mast member 63 in the vicinity of the end opposite to the protrusion side and projects outward from the outer surface. The abutment part 67*c* abuts against the stopper 67*a*, when the upper mast member 63 is protruded to the protrusion position, to be thereby prevented from further movement in the protrusion direction. The upper mast member 63 is thereby prevented from protrusion from the lower mast member 62 beyond the protrusion position.

Figure 6:
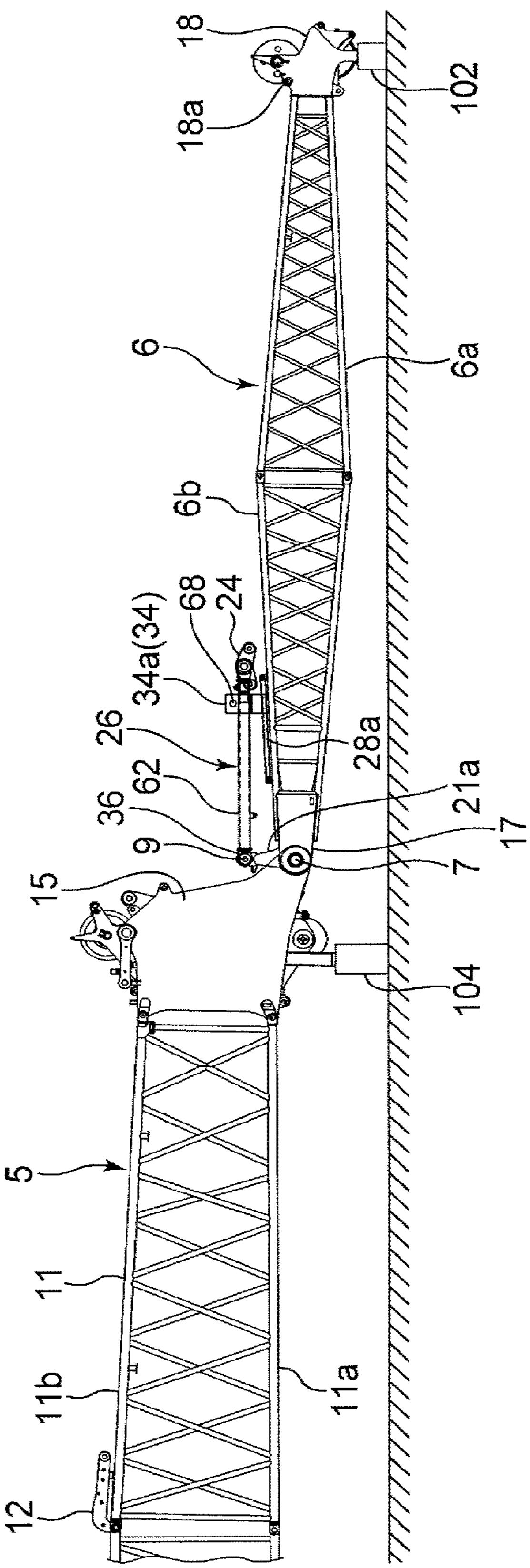
FIG. 6 is a side view showing a state where the derricking member of the crane according to the second embodiment is laid down and showing the step of assembling the derricking member and the jib posture retention device.

In the storage form of the jib mast 26 shown in FIG. 6, in the second embodiment, the jib-mast proximal end 36 is supported by the mast-proximal-end support part 21*a* of the jib proximal end 17 through the support pin 9, and the jib mast 26 is rendered in a laid-down posture of extending along the jib 6 from the mast-proximal-end support part 21*a* toward the jib distal end 18 while being contracted, that is, while the upper mast member 63 is located at the retraction position. The mast-proximal-end support part 21*a* is configured similarly to the uprising-proximal-end support part 21 in the first embodiment.

The storage holding part 34 in the second embodiment holds the jib mast 26 being in the laid-down posture and contracted as described above. The storage holding part 34 is provided on the back surface **6*b* of the jib 6 at a position closer to the jib distal end 18 than the storage holding part 34 in the first embodiment. The storage holding part 34 in the second embodiment, specifically, is attached to a member constituting the jib 6, for example, a diagonal member constituting a lattice structure on the back-surface-6*b* side of the jib 6 or the like. Except for the above-described configuration, the configuration of the storage holding part 34 is similar to that of the storage holding part 34** in the first embodiment.

The jib posture retention device 8, in the second embodiment, includes not only a holding pin 68 similar to the support pin 9 in the first embodiment for holding the jib mast 26 in the storage holding part 34 but also a support pin 9 to mount the jib-mast proximal end 36 on the mast-proximal-end support part **21*a*. In the second embodiment, thus, the support pin 9 is used for not both the support of the jib-mast proximal end 36 and the hold of the jib mast 26 at the storage holding part 34, but the jib posture retention device 8 further includes a holding pin 68 for holding the jib mast 26 by the storage holding part 34 separately from the support pin 9 for supporting the jib-mast proximal end 36 by the mast-proximal-end support part 21*a***.

In the second embodiment, the jib posture retention device 8 further includes a frontward-rotational-movement stopper **28*a* to be interposed between the jib mast 26 and the jib 6 to prevent the jib mast 26 in the uprise posture from frontward rotational movement (rotational movement to be laid along the jib 6). The frontward-rotational-movement stopper 28*a* also serves as a jib backstop stop for preventing the jib 6 from backward rotational movement when the derricking member 3 is in an uprise posture while the frontward-rotational-movement stopper 28*a* is interposed between the jib mast 26 and the jib 6 in an uprise posture. The frontward-rotational-movement stopper 28*a* has a configuration similar to that of the mast posture retaining member 28** in the first embodiment.

Besides, the jib posture retention device 8 in the second embodiment includes neither of the guide part 33 and the lying-proximal-end holding part 27 in the first embodiment.

Except for the above-described configuration, the configuration of the crane 100 according to the second embodiment is similar to that of the crane 100 according to the first embodiment.

Next will be described a method of assembling the crane 100 according to the second embodiment.

Similarly to the first embodiment, in the assembly method according to the second embodiment, the boom 5 is attached to the turning body 2 and the jib 6 is attached to the boom distal end 15, while the boom 5 and the jib 6 are placed in a posture of lying down to lie along the ground surface as shown in FIG. 6. In this state, the jib mast 26 is rendered in a laid-down posture to be in a storage form, held by the storage holding part 34 and the holding pin 68.

In this state, initially, the holding pin 68 is removed from the storage holding part 34. Following this, the jib-mast distal end 37 is suspended up by an unillustrated auxiliary crane, whereby the jib mast 26 is rotationally moved backward about the support pin 9 to be raised. The jib mast 26 is thereby shifted to a posture of standing up while kept contracted as shown in FIG. 7, rendered in a looseness allowing form of locating the rope connection part 24 at the looseness allowing position.

Next, the frontward-rotational-movement stopper **28*a* that had been fixed to the jib 6 in the posture of lying down along the back surface 6*b* of the jib 6 is raised and interposed between the back surface 6*b* of the jib 6 and the jib mast 26 that is in the uprise posture while contracted as described above. At this time, the distal end of the raised frontward-rotational-movement stopper 28*a* is connected to a predetermined place in the lower mast member 62. By the frontward-rotational-movement stopper 28*a*, the jib mast 26 is prevented from frontward rotational movement (rotation movement in a direction to be laid along the jib 6**).

Thereafter, in the same manner as the case of the first embodiment, the jib-side support rope 22 is installed between the jib-side rope connection place **18*a* and the rope connection part 24 by the connection of one end of the jib-side support rope 22 to the jib-side rope connection place 18*a* of the jib distal end 18 and the connection of the other end of the jib-side support rope 22 to the rope connection part 24, and the boom-side support rope 23 is installed between the boom-side rope connection place 12 and the rope connection part 24 by the connection of one end of the boom-side support rope 23 to the boom-side rope connection place 12 and the connection of the other end of the boom-side support rope 23 to the rope connection part 24**.

Next, the position fixing pin 65 is extracted from the through-hole of the lower mast member 62 and the through-hole in the vicinity of the end of the upper mast member 63 on the protrusion end, whereby the fixing of the upper mast member 63 at the retraction position is released. The jib-mast distal end 37 is thereafter lifted up by an auxiliary crane to expand the jib mast 26. That is, the upper mast member 63 is protruded from the inside of the lower mast member 62 to be located at the protrusion position. This causes the jib-side support rope 22 and the boom-side support rope 23 connected to the rope connection part 24 to be slightly tensioned. The position fixing pin 65 is, then, fitted into the through-hole of the lower mast member 62 and the through-hole **63*a* in the vicinity of the end of the upper mast member 63 opposite to the end opposite to the protrusion side, thereby fixing the upper mast member 63** at the protrusion position.

Thereafter, as in the first embodiment, the jib distal end support 102 is removed from below the jib distal end 18 to bring the jib distal end 18 into contact with the ground, and the boom 5 is rotationally moved upward to the extent of shifting the jib 6 to the predetermined frontward tilt posture with respect to the boom 5. That is, the boom 5 is rotationally moved upward to the extent of rendering the jib-side support rope 22 linearly tensioned between the rope connection part 24 and the jib-side rope connection place **18*a* and rendering the boom-side support rope 23 linearly tensioned between the rope connection part 24 and the boom-side rope connection place 12. The jib mast 26 is thereby rendered in the uprise posture (the tension form), locating the rope connection part 24 at the tensioning position. The state of the boom 5, jib 6, mast 26, rope connection part 24, jib-side support rope 22, and boom-side support rope 23 in the second embodiment at this time is similar to the state shown in FIG. 5** in the first embodiment.

Thereafter, the jib-mast back stop 29 is interposed between the boom distal end 15 and the jib mast 26 to prevent the jib mast 26 from backward rotational movement (the rotational movement of the jib mast 26 in the direction opposite to the direction to be laid along the jib 6), and the jib mast 26 is fixed in the uprise posture by the jib-mast back stop 29 and the frontward-rotational-movement stopper 28*a* that has been already interposed between the jib mast 26 and the jib 6.

The subsequent steps of the method of assembling the crane 100 according to the second embodiment are similar to that of the method of assembling the crane 100 according to the first embodiment.

Besides, the method of disassembling the crane 100 according to the second embodiment is performed through a reverse procedure to that of the assembly method described above. For shifting the jib mast 26 in the tension form to the looseness allowing form, during the procedure in the method of disassembling the crane 100 according to the second embodiment, the upper mast member 63 at the protrusion position is retracted into the lower mast member 62 to the retraction position. Specifically, the position fixing pin 65 that have been fixing the upper mast member 63 at the protrusion position is extracted from the through-hole of the lower mast member 62 and the through-hole 63*a* of the upper mast member 63 to release the fixing, while the supporting the jib-mast distal end 37 is suspended and supported by the auxiliary crane, and then the jib-mast distal end 37 is lowered while suspended by the auxiliary crane, whereby the upper mast member 63 is retracted into the lower mast member 62 to the retraction position. By the retraction of the upper mast member 63 to the retraction position to shift the jib mast 26 to the looseness allowing form, the rope connection part 24 is located at the looseness allowing position.

The other end of the jib-side support rope 22 and the other end of the boom-side support rope 23 are then removed from the rope connection part 24 located at the looseness allowing position. Besides, the one end of the jib-side support rope 22 is removed from the jib-side rope connection place 18*a* of the jib distal end 18 and the one end of the boom-side support rope 23 is removed from the boom-side rope connection place 12 with the jib mast 26 in the looseness allowing form.

According to the second embodiment, the rope connection part 24 can be moved from one of the tensioning position and the looseness allowing position to the other thereof by the expansion and contraction of the jib mast 26, which can provide the same effect as the first embodiment: reducing both the burden on a worker in the work of installing the jib-side support rope 22 and the work of removing the installed jib-side support rope 22 and the burden on a worker involved in the work of installing the boom-side support rope 23 and the work of removing the installed boom-side support rope 23.

In addition, the second embodiment, in which the jib mast 26 can be shifted to any of the storage form (fall-down posture), the looseness allowing form, and the tension form (uprise posture) while the jib-mast proximal end 36 is kept attached to the mast-proximal-end support part 21*a*, requires no attachment/detachment of the jib-mast proximal end 36 to/from the mast-proximal-end support part 21*a* for the shift of the jib mast 26 between the above forms. This allows the burden on a worker, in the second embodiment, to be further reduced. Besides, the second embodiment, where the jib-mast proximal end 36 can be shifted to any of the storage form, the looseness allowing form, and the tension form, while the jib-mast proximal end 36 is kept attached to the mast-proximal-end support part 21*a*, does not require the guide part 33 in the first embodiment for guiding the movement of the jib-mast proximal end 36 between the uprising-proximal-end support part 21 and the lying-proximal-end holding part 27 to shift the jib mast 26 between the looseness allowing form (looseness-allowing lying posture) and the tension form (uprise posture). This allows the derricking member 3 to have reduced weight.

Besides, each of the lower mast member 62 and the upper mast member 63 constituting the jib mast 26 is tubular, allowing the jib mast 26 to have reduced weight.

According to the second embodiment, the jib mast 26 can be shifted to any of the looseness allowing form and the tension form while the frontward-rotational-movement stopper 28*a* is kept interposed between the jib mast 26 and the jib 6. This allows the burden on a worker involved in the attachment and detachment work of the frontward-rotational-movement stopper 28*a* to be reduced. Specifically, for the shift of the jib mast 26 from the looseness allowing form to the tension form, the first embodiment requires the operation of removing the mast posture retaining member 28 interposed between the jib mast 26 in the looseness-allowing lying posture and the jib 6 to render the jib mast 26 in the uprise posture and thereafter remounting the mast posture retaining member 28 between the jib mast 26 and the jib 6. Also, for shifting the jib mast 26 from the tension form to the looseness allowing form, the first embodiment requires the operation of removing the mast posture retaining member 28 interposed between the jib mast 26 in the uprise posture and the jib 6 to shift the jib mast 26 to the looseness allowing posture and thereafter remounting the mast posture retaining member 28 between the jib mast 26 and the jib 6. In contrast to the mast posture retaining member 28, the second embodiment does not require any attachment/detachment of the frontward-rotational-movement stopper 28*a* for shifting the jib mast 26 between the looseness and tension forms. This allows the burden on a worker in the attachment/detachment work of the frontward-rotational-movement stopper 28*a* to be reduced.

According to the second embodiment, the jib mast 26 is expandable and contractable, which allows the jib mast 26 to be very compactly contracted when rendered in the storage posture. This enables the jib mast 26 to be unobstructive to a worker.

According to the second embodiment, when protruded to the protrusion position, the upper mast member 63 can be fixed to the lower mast member 62 at the protrusion position by the position fixing pin 65 to enable the jib mast 26 to be retained in the tension form.

According to the second embodiment, the jib mast 26 includes the protrusion prevention unit 67 that prevents the upper mast member 63 from being protruded from the lower mast member 62 beyond the protrusion position. The upper mast member 63 having been protruded from the lower mast member 62 to the protrusion position, therefore, can be prevented from further protrusion by the protrusion prevention unit 67. This enables the upper mast member 63 to be prevented from accidental removal from the lower mast member 62 due to the excessive protrusion of the upper mast member 63 from the lower mast member 62.

Third Embodiment

Next will be described a configuration of a crane 100 according to a third embodiment of the present invention with reference to FIGS. 10 to 14.

The crane 100 according to the third embodiment differs from the crane 100 according to the first embodiment in the configuration of the jib mast 26. The jib mast 26 in the third embodiment is configured to be shiftable from one of a tension form and a looseness allowing form to the other by bending and stretching thereof.

Specifically, in the third embodiment, the jib mast 26 includes a lower mast member 62, an upper mast member 63, an axial pin 70, and a posture fixing pin 71.

The lower mast member 62 is attached to a jib proximal end 17 rotatably about an axis parallel to the rotation axis of a jib 6 (the rotation axis of the jib proximal end 17). The lower mast member 62 is a linearly extending member. The lower mast member 62 has a lower-member proximal end 72, which is one end of the lower mast member 62, and a lower-member distal end 73, which is an end opposite to the lower-member proximal end 72.

The lower-member proximal end 72 is attached to a mast-proximal-end support part 21*a* of a jib proximal end 17 through a support pin 9, being rotationally movable about an axis parallel to the rotation axis of the jib 6 (around the support pin 9). The lower-member proximal end 72 forms a jib-mast proximal end 36.

The lower-member distal end 73 includes a pair of side plate parts 74 (see FIG. 14) spaced in a direction parallel to the rotation axis of the lower-member proximal end 72. Each of the side plate parts 74 is provided with an axial-pin insertion hole 76 and a fixing-pin insertion hole 77 each piercing the side plate part 74. The axial-pin insertion hole 76 and the fixing-pin insertion hole 77 are spaced in the axis direction of the lower mast member 62 (the extension direction of the lower mast member 62).

Figure 10:
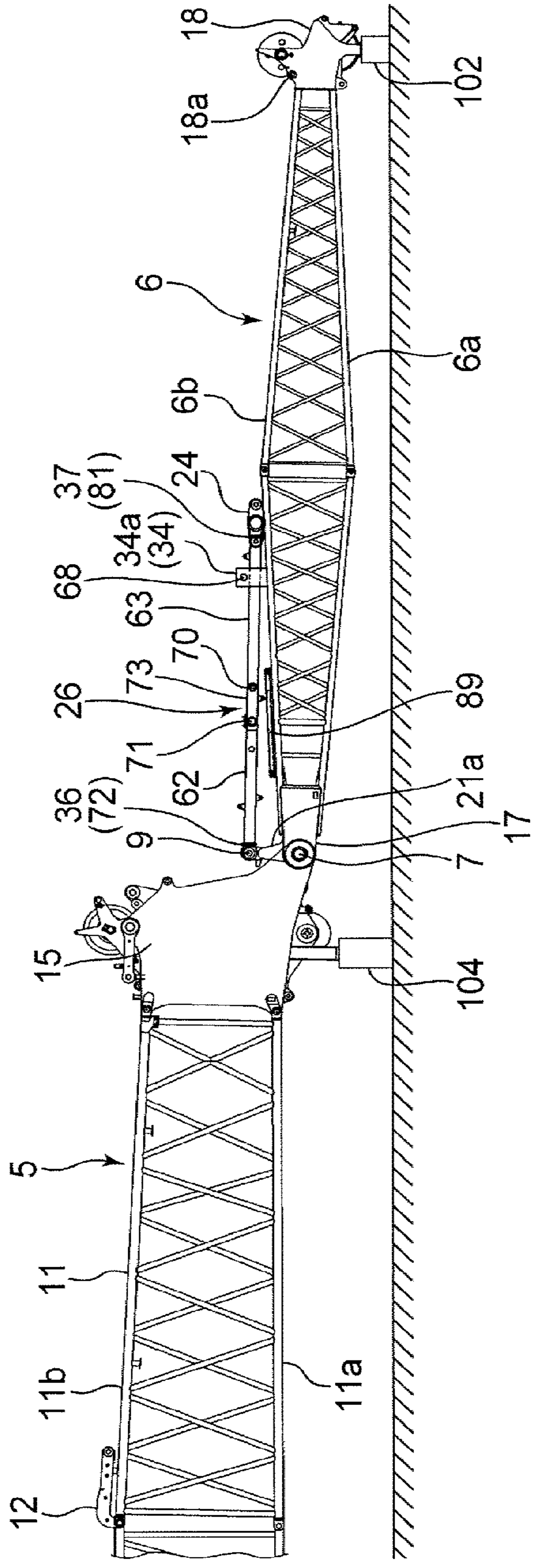
FIG. 10 is a side view showing a state where a derricking member of a crane according to a third embodiment is laid down and showing the step of assembling the derricking member and a jib posture retention device.
Figure 11:
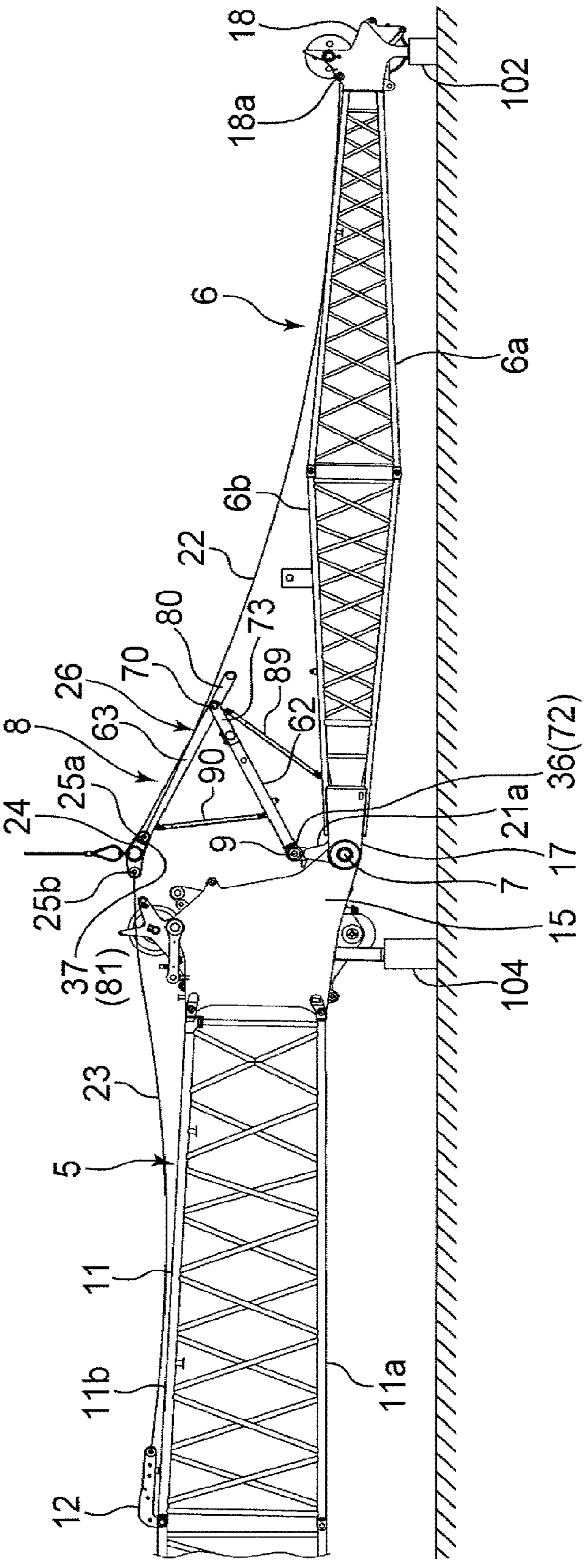
FIG. 11 is a side view showing a state where the derricking member of the crane according to the third embodiment is laid down and showing the step of assembling the derricking member and the jib posture retention device.
Figure 12:
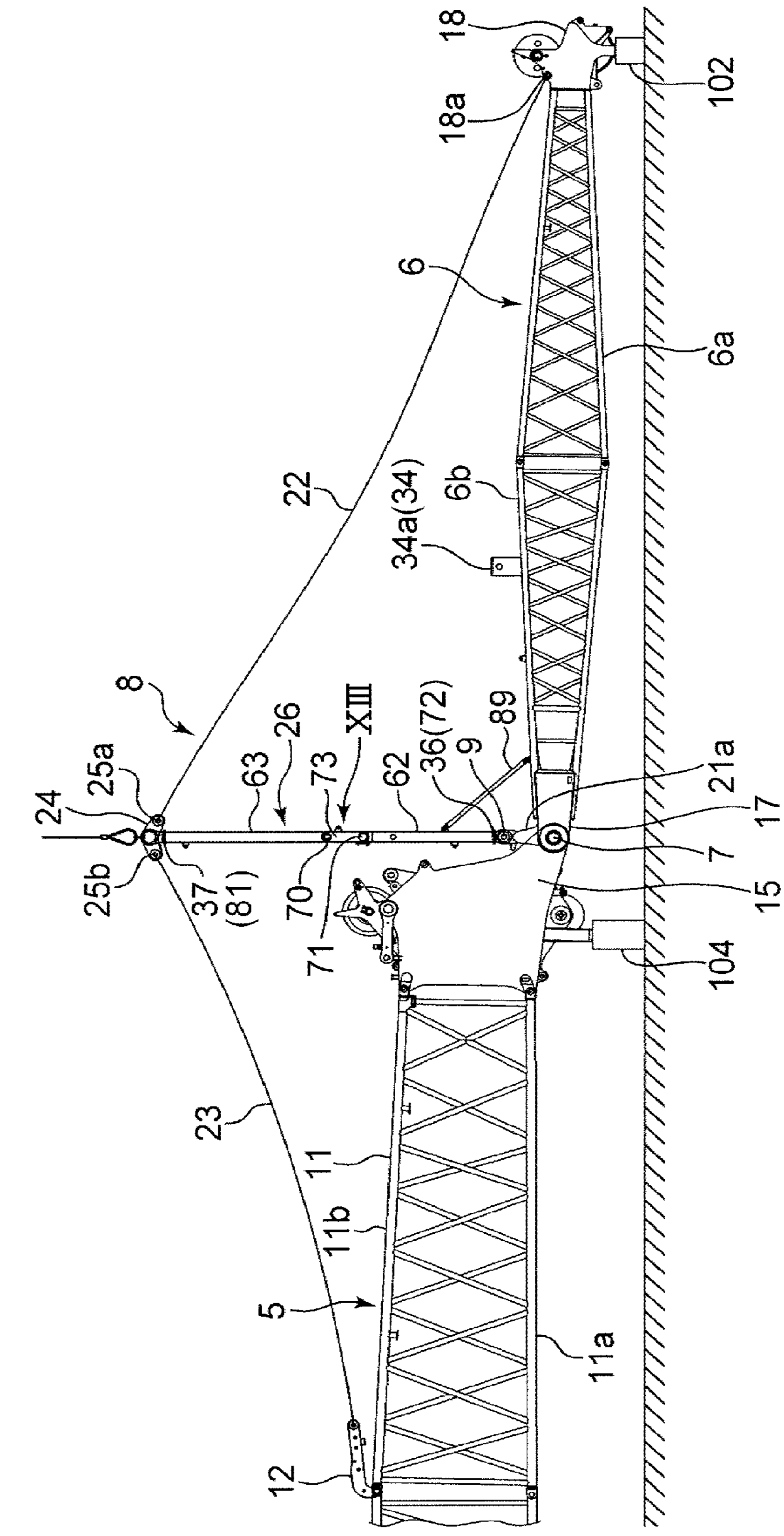
FIG. 12 is a side view showing a state where the derricking member of the crane according to the third embodiment is laid down and showing the step of assembling the derricking member and the jib posture retention device.
Figure 13:
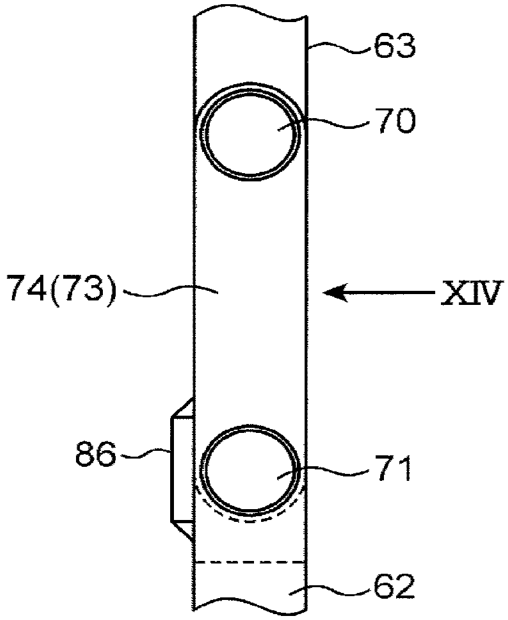
FIG. 13 is a view showing the partially enlarged cross section of the XIII part, which is the interconnection place of an upper mast member and a lower mast member of the jib mast shown in FIG. 12.
Figure 14:
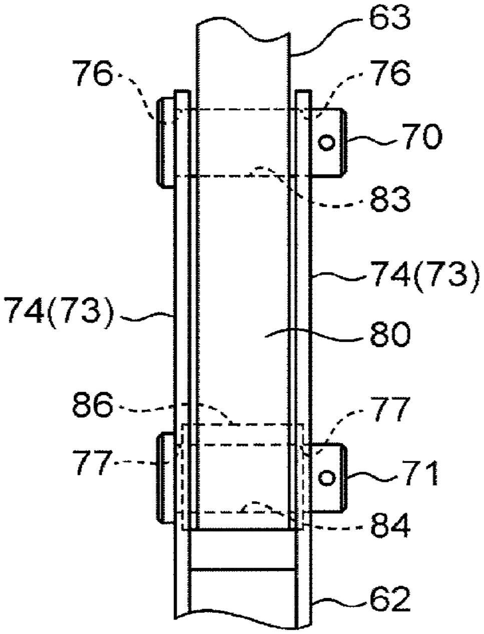
FIG. 14 is a view of the interconnection place of an upper mast member and a lower mast member of the jib mast shown in FIG. 13 viewed along the direction of arrow XIV in FIG. 13.

As shown in FIGS. 10 to 12, the upper mast member 63 is connected to the lower-member distal end 73 of the lower mast member 62 rotatably about an axis parallel to the rotation axis of the lower-member proximal end 72, i.e., about an axis parallel to the rotation axis of the jib 6. The upper mast member 63 is a linearly extending member. The upper mast member 63 has an upper-member proximal end 80, which is one end of the upper mast member 63, and an upper-member distal end 81, which is an end opposite to the upper-member proximal end 80. The upper-member proximal end 80 of the upper mast member 63 is attached to the lower-member distal end 73 rotatably about an axis parallel to the rotation axis of the lower-member proximal end 72.

Specifically, the upper-member proximal end 80 is provided with an axial-pin insertion hole 83 piercing the upper-member proximal end 80. The upper-member proximal end 80 is disposed between the pair of side plate parts 74 of the lower-member distal end 73. The upper-member proximal end 80 is attached to the lower-member distal end 73 by the insertion of the axial pin 70 through the axial-pin insertion hole 83 of the upper-member proximal end 80 and respective axial-pin insertion holes 76 of the pair of side plate parts 74. The axial pin 70 is placed so as to extend parallel to the rotation axis of the lower-member proximal end 72, allowing the upper-member proximal end 80 to be moved rotationally about the axial pin 70 and relatively to the lower-member distal end 73. Such rotational movability of the upper-member proximal end 80 relative to the lower-member distal end 73 enables the upper mast member 63 to be shifted to any of a stretching posture in which the upper mast member 63 extends in the same direction as the lower mast member 62 on the extension of the lower mast member 62 as shown in FIGS. 10 and 12 and a bending posture in which the upper mast member 63 is tilted with respect to the lower mast member 62 in a bending form as shown in FIG. 11.

In the third embodiment, the upper mast member 63 is configured to be fixed to the lower mast member 62 by the posture fixing pin 71 when rendered in the stretching posture. The posture fixing pin 71 is an example of a posture fixing member according to the present invention. Specifically, the upper-member proximal end 80 is provided with a fixing-pin insertion hole 84 piercing the upper-member proximal end 80 at a position spaced from the axial-pin insertion hole 83 along the axis direction of the upper mast member 63 (the extension direction of the upper mast member 63). When the upper mast member 63 is in the stretching posture, the position of the fixing-pin insertion hole 84 provided in the upper-member proximal end 80 is aligned with the position of the fixing-pin insertion hole 77 provided in each of the side plate parts 74 of the lower-member distal end 73. In this state, the posture fixing pin 71 can be fitted into the fixing-pin insertion hole 84 of the upper-member proximal end 80 and the fixing-pin insertion hole 77 of each of the side plate parts 74 of the lower-member distal end 73, thereby restraining the upper mast member 63 from movement in the rotational direction relative to the lower mast member 62, that is, fixing the upper mast member 63 in the stretching posture.

In the third embodiment, the rope connection part 24 is attached to the upper-member distal end 81 of the upper mast member 63. In the third embodiment, the upper-member distal end 81 forms a jib-mast distal end 37.

The jib mast 26 locates the rope connection part 24 at the tensioning position when the lower mast member 62 is in a posture of extending from the jib proximal end 17 backward thereof and the upper mast member 63 is in the stretching posture with respect to the lower mast member 62. Besides, the jib mast 26 locates the rope connection part 24 at the looseness allowing position when the lower mast member 62 is in the inclination posture and with the upper mast member 63 is in the bending posture with respect to the lower mast member 62. In summary, in the third embodiment, the tension form of the jib mast 26 is a state where the lower mast member 62 extends from the jib proximal end 17 backward thereof and the upper mast member 63 is in the stretching posture, and the looseness allowing form of the jib mast 26 is a state where the lower mast member 62 is in the inclination posture and the upper mast member 63 is in the bending posture.

In the third embodiment, the jib mast 26 further includes a rotational-movement prevention part 86 (see FIG. 13) that prevents the upper mast member 63 from rotational movement relative to the lower mast member 62 toward the side opposite to the bending posture beyond the tensioning position. The rotational-movement prevention part 86 is installed between the pair of side plate parts 74 of the lower-member distal end 73 of the lower mast member 62. The upper mast member 63 in the stretching posture locates the upper-member proximal end 80 between the pair of side plate parts 74 of the lower-member distal end 73 while the upper-member proximal end 80 extends in the same direction as the lower mast member 62. In this state, the rotational-movement prevention part 86 comes into abutment with the upper-member proximal end 80 in a direction opposite to the direction in which the upper-member proximal end 80 is moved about the axial pin 70, when the upper mast member 63 intends to move rotationally to the side opposite to the bending posture beyond the stretching posture, to prevent the upper-member proximal end 80 from the movement, thereby preventing the upper mast member 63 from rotational movement to the side opposite to the bending posture beyond the stretching posture.

In the third embodiment, the jib posture retention device 8 includes a retainer 88 that retains the posture of the lower mast member 62 to the jib 6 and the posture of the upper mast member 63 to the lower mast member 62 when the lower mast member 62 is in the inclination posture and the upper mast member 63 is in the bending posture. The retainer 88 includes a lower retainer 89 and an upper retainer 90.

The lower retainer 89 is configured to be interposed between the lower mast member 62 in the inclination posture and the jib 6 so as to prevent the lower mast member 62 from rotational movement in a direction to approach the jib 6 from the inclination posture. Specifically, the lower retainer 89 is a rod-shaped member. When interposed between the lower mast member 62 in the inclination posture and the jib 6, the lower retainer 89 is placed in a posture of extending in a direction crossing respective axis directions of the lower mast member 62 and the jib 6, and one end of the lower retainer 89 in the longitudinal direction (extension direction) is connected to the lower mast member 62 while the other end opposite to the one end of the lower retainer 89 is connected to the jib 6. The one end of the lower retainer 89 is attachable to and detachable from the lower mast member 62. For the rotational movement of the lower mast member 62 in the uprising direction from the inclination posture and in the falling down direction, the connection of the lower retainer 89 to the lower mast member 62 is released and the lower retainer 89 is located at a position where the lower retainer 89 is unobstructive to the rotational movement of the lower mast member 62.

The lower retainer 89 is used not only for preventing the lower mast member 62 from rotational movement in the direction to approach the jib 6 from the inclination posture but also as a stopper for preventing the jib mast 26 in the uprise posture from rotational movement in the direction to be laid along the jib 6. In summary, as shown in FIG. 12, the lower retainer 89 is configured to be interposable between the jib mast 26 in the uprise posture and the jib 6 to prevent the jib mast 26 from rotational movement about the jib-mast proximal end 36 (the support pin 9) in the direction to be laid along the jib 6. When interposed between the jib mast 26 in the uprise posture and the jib 6, the lower retainer 89 is placed in a posture of extending in a direction crossing respective axis directions of the jib mast 26 in the uprise posture and the jib 6, and one end of the lower retainer 89 is connected to the lower mast member 62 of the jib mast 26 while the other end of the lower retainer 89 is connected to the jib 6. Also in this case, the one end of the lower retainer 89 is attachable to and detachable from the lower mast member 62, and the other end of the lower retainer 89 is attachable to and detachable from the jib 6.

The upper retainer 90 is interposed between the upper mast member 63 in the bending posture and the lower mast member 62 so as to prevent the upper mast member 63 from rotational movement in a direction to approach the lower mast member 62 from the bending posture. Specifically, the upper retainer 90 is a rod-shaped member. When interposed between the upper mast member 63 in the bending posture and the lower mast member 62 in the inclination posture, the upper retainer 90 is placed in a posture of extending in a direction crossing both the upper mast member 63 and the lower mast member 62, and one end of the upper retainer 90 in the longitudinal direction (extension direction) is connected to the upper mast member 63 while the other end opposite to the one end of the upper retainer 90 is connected to the lower mast member 62. The one end of the upper retainer 90 is attachable to and detachable from the upper mast member 63, and the other end of the upper retainer 90 is attachable to and detachable from the lower mast member 62. For the rotational movement of the upper mast member 63 from the bending posture, the upper retainer 90 is removed from the upper mast member 63 and the lower mast member 62.

The upper retainer 90 is used not only for preventing the upper mast member 63 from rotational movement in a direction to approach the lower mast member 62 from the bending posture but also as a jib-mast back stop for preventing the jib mast 26 in the uprise posture from rotational movement in the direction opposite to the direction to be laid along the jib 6. In summary, the upper retainer 90 is configured to be interposable between the jib mast 26 in the uprise posture and the boom distal end 15 to prevent the jib mast 26 from rotational movement with the jib-mast proximal end 36 (support pin 9) as a fulcrum in a direction opposite to the direction to be laid along the jib 6. When interposed between the jib mast 26 in the uprise posture and the boom distal end 15, the upper retainer 90 is placed in a posture of extending in a direction crossing respective axis directions of the jib mast 26 in the uprise posture and the boom 5, and one end of the upper retainer 90 is connected to the lower mast member 62 of the jib mast 26 while the other end of the upper retainer 90 is connected to the boom distal end 15. Also in this case, the one end of the upper retainer 90 is attachable to and detachable from the lower mast member 62, and the other end of the upper retainer 90 is attachable to and detachable from the boom distal end 15.

In the storage form of the jib mast 26 shown in FIG. 10, in the third embodiment, the jib mast 26 is rendered in a posture of being laid down in which the lower mast member 62 extends along the axis direction of the jib 6 from the mast-proximal-end support part 21*a* toward the jib distal end 18 and the upper mast member 63 extends along the extension of the lower mast member 62 in the same direction as the extension. The mast-proximal-end support part 21*a* in the third embodiment is configured to be similar to the uprising-proximal-end support part 21 in the first embodiment.

The storage holding part 34 in the third embodiment holds the jib mast 26 laid down as described above. Specifically, the storage holding part 34 holds the upper mast member 63 out of the jib mast 26 thus laid down. The storage holding part 34 is provided on the back surface 6*b* of the jib 6 at a position closer to the jib distal end 18 than the storage holding part 34 in the first and second embodiments. Except for this configuration, the configuration of the storage holding part 34 is similar to that of the storage holding part 34 in the first embodiment. As in the second embodiment, incidentally, the jib posture retention device 8 in the third embodiment includes a holding pin 68 for holding the jib mast 26 in the storage holding part 34, separately from the support pin 9 for supporting the jib-mast proximal end 36 in the mast-proximal-end support part 21*a*.

Except for the above configuration, the configuration of the crane 100 according to the third embodiment is similar to that of the crane 100 according to the first embodiment.

Next will be described a method of assembling the crane 100 according to the third embodiment.

As in the first embodiment, in the assembly method according to the third embodiment, the boom 5 is attached to the turning body 2 and the jib 6 is attached to the boom distal end 15, and, in this state, the boom 5 and the jib 6 are placed in a posture to be laid along the ground surface, as shown in FIG. 10. This state is the storage form in which the jib mast 26 is laid down in the stretching posture where the lower mast member 62 extends from the mast-proximal-end support part 21*a* toward the jib distal end 18 along the axis direction of the jib 6 and the upper mast member 63 extends along the extension of the lower mast member 62 in the same direction as the extension. The jib mast 26 in the storage form is held by the storage holding part 34 and the holding pin 68. Meanwhile, the upper mast member 63 is fixed to the lower mast member 62 in the stretching posture by the posture fixing pin 71.

In this state, the posture fixing pin 71 is removed from the lower mast member 62 and the upper mast member 63, whereby the fixing of the posture of the upper mast member 63 to the lower mast member 62 is released. The holding pin 68 is removed from the storage holding part 34. Thereafter, by an unillustrated auxiliary crane, the upper-member distal end 81 (the jib-mast distal end 37) is suspended up and made to approach the boom distal end 15 to move the rope connection part 24 to the looseness allowing position. This causes the upper mast member 63 to be moved rotationally backward about the axial pin 70 and causes the lower mast member 62 to be moved rotationally in the uprising direction about the support pin 9, thereby rendering the lower mast member 62 in the inclination posture and rendering the upper mast member 63 in the bending posture, as shown in FIG. 11.

Thereafter, the lower mast member 62 is fixed in the inclination posture by the lower retainer 89, and the upper mast member 63 is fixed in the bending posture by the upper retainer 90. Specifically, the lower retainer 89 that had been fixed to the jib 6 in a posture of lying down along the back surface 6*b* of the jib 6 is raised and the distal end of the lower retainer 89 is connected to the lower mast member 62 to interpose the lower retainer 89 between the back surface 6*b* of the jib 6 and the lower mast member 62 in the inclination posture, while the upper retainer 90 is interposed between the upper mast member 63 and the lower mast member 62.

Thereafter, as in the case of the first embodiment, the jib-side support rope 22 is installed between the jib-side rope connection place 18*a* and the rope connection part 24 by the connection of one end of the jib-side support rope 22 to the jib-side rope connection place 18*a* of the jib distal end 18 and the connection of the other end of the jib-side support rope 22 to the rope connection part 24, and the boom-side support rope 23 is installed between the boom-side rope connection place 12 and the rope connection part 24 by the connection of one end of the boom-side support rope 23 to the boom-side rope connection place 12 and the connection of the other end of the boom-side support rope 23 to the rope connection part 24.

Next, with the upper-member distal end 81 suspended by the auxiliary crane, the connection of the distal end of the lower retainer 89 to the lower mast member 62 is released and the upper retainer 90 is removed from the upper mast member 63 and the lower mast member 62. By an auxiliary crane, thereafter, the upper-member distal end 81 is lifted up from the looseness allowing position. This causes the lower mast member 62 to be moved rotationally about the support pin 9 further in the uprising direction from the inclination posture, and causes the upper mast member 63 to be moved rotationally frontward about the axial pin 70 from the bending posture. As shown in FIG. 12, then, the upper-member distal end 81 is lifted up to the extent of forming the stretching posture in which the lower mast member 62 extends from the mast-proximal-end support part 21*a* backward (upward) of the jib proximal end 17 and the upper mast member 63 extends along the extension of the lower mast member 62 in the same direction as the lower mast member 62. Thereafter, the posture fixing pin 71 is fitted into the fixing-pin insertion hole 84 of the upper-member proximal end 80 and the fixing-pin insertion hole 77 of each of the side plate parts 74 of the lower-member distal end 73. The upper mast member 63 is thereby fixed to the lower mast member 62, in the stretching posture. This renders the jib-side support rope 22 and the boom-side support rope 23, which are connected to the rope connection part 24, slightly tensioned.

Thereafter, as in the first embodiment, the jib distal end support 102 is removed from below the jib distal end 18 to bring the jib distal end 18 into contact with the ground, and the boom 5 is rotationally moved upward to the extent of bringing the jib 6 into a predetermined frontward tilt posture with respect to the boom 5. Specifically, the boom 5 is rotationally moved upward to the extent of rendering the jib-side support rope 22 linearly tensioned between the rope connection part 24 and the jib-side rope connection place 18*a* and rendering the boom-side support rope 23 linearly tensioned between the rope connection part 24 and the boom-side rope connection place 12. This causes the jib mast 26 to be in the uprise posture (the tension form) to locate the rope connection part 24 at the tensioning position. Respective states of the boom 5, the jib 6, the jib mast 26, the rope connection part 24, the jib-side support rope 22, and boom-side support rope 23 in the third embodiment at this stage are similar to the states shown in FIG. 5 according to the first embodiment.

The jib mast 26 is, thereafter, fixed in the uprise posture. Specifically, the lower retainer 89 is interposed between the back surface 6*b* of the jib 6 and the jib mast 26 to thereby prevent the jib mast 26 from frontward rotational movement (movement in the direction to be laid along the jib 6), and the upper retainer 90 is interposed between the boom distal end 15 and the jib mast 26 to prevent the jib mast 26 from backward rotational movement (rotational movement in the direction opposite to the direction to be laid along the jib 6), whereby the jib mast 26 is fixed in the uprise posture. The method for the interposition of the lower retainer 89 is similar to the method for the interposition of the mast posture retaining member 28 in the first embodiment, and the method for interposition of the upper retainer 90 is similar to the method for interposition of the jib-mast hack stop 29 in the first embodiment.

The subsequent steps of the method of assembling the crane 100 according to the third embodiment are similar to that of the method of assembling the crane 100 according to the first embodiment. Similarly to the mast posture retaining member 28, which is interposed between the back surface 6*b* of the jib 6 and the jib mast 26 to prevent the jib mast 26 in the uprise posture from rotational movement in the direction to be laid along the jib 6 in the first embodiment, the lower retainer 89, in the third embodiment, is interposed between the back surface 6*b* of the jib 6 and the jib mast 26. Besides, similarly to the mast back stop 29, which is interposed between the boom distal end 15 and the jib mast 26 to prevent the jib mast 26 in the uprise posture from rotational movement in the direction opposite to the direction to be laid along the jib 6 in the first embodiment, the upper retainer 90, in the third embodiment, is interposed between the boom distal end 15 and the jib mast 26.

The method of disassembling the crane 100 according to the third embodiment is performed through a procedure reverse to that of the assembly method described above. During the procedure, for the shift of the jib mast 26 in the tension form to the looseness allowing form in the method of disassembling the crane 100 according to the third embodiment, the lower mast member 62 in the posture of extending from the mast-proximal-end support part 21*a* backward thereof is shifted to the inclination posture, and the upper mast member 63 in the stretching posture is shifted to the bending posture. Specifically, with the upper-member distal end 81 suspended and supported by an auxiliary crane, the lower retainer 89 interposed between the jib mast 26 in the uprise posture and the back surface 6*b* of the jib 6 is removed and the upper retainer 90 interposed between the jib mast 26 and the boom distal end 15 is removed, whereby the fixing of the jib mast 26 in the uprise posture is released.

The posture fixing pin 71 is extracted, thereafter, from the fixing-pin insertion hole 84 of the upper-member proximal end 80 and the fixing-pin insertion hole 77 of each of the side plate parts 74 of the lower-member distal end 73, whereby the fixing of the upper mast member 63 in the stretching posture is released. The upper-member distal end 81, thereafter, is lowered while suspended by an auxiliary crane, causing the upper mast member 63 to be rotationally moved backward about the axial pin 70 from the tensioning position and causing the lower mast member 62 to be rotationally moved frontward about the support pin 9. This renders the upper mast member 63 in the bending posture and renders the lower mast member 62 in the inclination posture, rendering the jib mast 26 in the looseness allowing form.

In this state, the lower retainer 89 is interposed between the back surface 6*b* of the jib 6 and the lower mast member 62 in the inclination posture and the upper retainer 90 is interposed between the upper mast member 63 and the lower mast member 62, whereby the lower mast member 62 is fixed in the inclination posture and the upper mast member 63 is fixed in the bending posture.

By the above-described shift of the jib mast 26 to the looseness allowing form, the rope connection part 24 is located at the looseness allowing position. From the rope connection part 24 thus located at the looseness allowing position, the other end of the jib-side support rope 22 and the other end of the boom-side support rope 23 are removed. Besides, with the jib mast 26 in the looseness allowing form, one end of the jib-side support rope 22 is removed from the jib-side rope connection place 18*a* of the jib distal end 18 and one end of the boom-side support rope 23 is removed from the boom-side rope connection place 12.

The third embodiment, where the rope connection part 24 is allowed to be moved from one of the tensioning position and the looseness allowing position to the other by bending and stretching of the jib mast 26, can provide the same effect as the first embodiment: reducing the burden on a worker involved in the work of installing the jib-side support rope 22 and the work of removing the installed jib-side support rope 22; and reducing the burden on a worker involved in the work of installing the boom-side support rope 23 and the work of removing the installed boom-side support rope 23.

In addition, the third embodiment, where the jib mast 26 can be shifted to any of the storage form, the looseness allowing form and the tension form while the jib-mast proximal end 36 is kept attached to the mast-proximal-end support part 21*a*, requires neither of attachment and detachment of the jib-mast proximal end 36 to and from the jib-mast proximal support part 21 for the shift of the jib mast 26 between the forms. The third embodiment, therefore, allows the burden on ae worker to be further reduced. Besides, the third embodiment, allowing the jib mast 26 to be shifted to any of the storage form, the looseness allowing form, and the tension form while the jib-mast proximal end 36 is kept attached to the mast-proximal-end support part 21*a*, does not require the guide part 33 provided in the first embodiment, as in the second embodiment. This allows the derricking member 3 to have reduced weight.

In the third embodiment, the upper mast member 63 can be fixed to the lower mast member 62 in the stretching posture by the posture fixing pin 71. This enables the jib mast 26, which has been shifted to the tension form in which the upper mast member 63 is in the stretching posture and the jib mast 26 has uprisen, to be stably retained in the tension form.

The jib mast 26, in the third embodiment, includes a rotational-movement prevention part 86 that prevents the upper mast member 63 from rotational movement to the side opposite to the bending posture beyond the stretching posture. The rotational-movement prevention part 86 can prevent the upper mast member 63 from rotational movement in the direction opposite to the bending posture when the upper-member distal end 81, which is the distal end of the upper mast member 63, is lowered while being suspended by an auxiliary crane, from the state where the upper mast member 63 is in the stretching posture and the jib mast 26 is in the uprise posture of extending upward from the jib proximal end 17 while the boom 5 and the jib 6 are laid down, during the disassembly of the crane 100. This makes it possible to move the upper mast member 63 rotationally in the intended direction when the upper-member distal end 81 is lowered to bring the upper mast member 63 into the bending posture and to prevent the lower mast member 62 from interfering with the boom distal end 15 due to the rotational movement of the upper mast member 63 in the opposite direction to cause the upper mast member 63 and the lower mast member 62 to be bent in the direction opposite to the state of FIG. 11.

In the third embodiment, the lower mast member 62 can be retained in the inclination posture by the lower retainer 89 and the upper mast member 63 can be retained in the bending posture by the upper retainer 90. This enables the upper mast member 63 to be retained in the bending posture more stably and enables the lower mast member 62 to be retained in the inclination posture more stably than the case where the upper mast member 63 is retained in the bending posture and the lower mast member 62 is retained in the inclination posture only by the suspension of the upper mast member 63 by an auxiliary crane. This allows the rope connection part 24 to be held at the looseness allowing position more stably, facilitating the operation of connecting the jib-side support rope 22 and the boom-side support rope 23 to the rope connection part 24.

In the third embodiment, the lower retainer 89 is configured to be interposable between the jib mast 26 in the uprise posture and the jib 6 so as to prevent the jib mast 26 from rotational movement in a direction to be laid along the jib 6, and the upper retainer 90 is configured to be interposable between the jib mast 26 in the uprise posture and the boom distal end 15 to prevent the jib mast 26 from rotational movement in the direction opposite to the direction to be laid along the jib 6. This enables the lower retainer 89 to be used not only for preventing the lower mast member 62 in the inclination posture from rotational movement in a direction to approach the jib 6 from the inclination posture but also as a stopper for preventing the jib mast 26 from rotational movement in the direction to be laid along the jib 6, and enables the upper retainer 90 to be used not only for preventing the upper mast member 63 in the bending posture from rotational movement in a direction to approach the lower mast member 62 from the bending posture but also as a jib-mast back stop for preventing the jib mast 26 in the uprise posture from rotational movement in the direction opposite to the direction to be laid along the jib 6. This allows the number of required members to be reduced for retaining the lower mast member 62 in the inclination posture, retaining the upper mast member 63 in the bending posture and retaining the jib mast 26 in the uprise posture, thereby allowing the manufacturing cost to be reduced.

(Modification)

The crane according to the present invention is not necessarily limited to be configured as described above. For example, the following configuration can be adopted as the configuration of the crane according to the present invention.

(1) Although the posture of the jib mast 26 in the looseness-allowing lying posture is retained, in the first embodiment, by the interposition of the mast posture retaining member 28 between the jib mast 26 and the jib 6, the retention of the posture of the jib mast 26 by the mast posture retaining member 28 is optional. It is also permissible to retain the jib mast 26 in the looseness-allowing lying posture only by the suspension of the jib-mast distal end 37 by an auxiliary crane.

(2) In the first embodiment, the posture of the jib mast 26 during the work of installing the jib-side support rope 22 and the boom-side support rope 23 may be the same posture as the storage lying posture. In this case, the same posture as the storage lying posture of the jib mast 26 in the first embodiment corresponds to the looseness-allowing lying posture of the jib mast in the present invention, and the position at which the rope connection part 24 is located when the jib mast 26 is in the storage lying posture in the first embodiment corresponds to the looseness allowing position of the rope connection part in the present invention. In this case, respective operations are omittable for holding the rope connection part 24 at the looseness allowing position having the height in the vicinity of the back surface 11*b* of the boom body 11 and holding the jib mast 26 in the looseness-allowing lying posture inclined to the axis direction of the jib 6, which operations are performed in the first embodiment. Specifically, respective operations are omittable for suspending up the jib-mast distal end 37 by an auxiliary crane to hold the rope connection part 24 at the looseness allowing position having the height in the vicinity of the back surface 11*b* of the boom body 11 and interposing the mast posture retaining member 28 between the jib mast 26 and the jib 6 to retain the jib mast 26 in the looseness-allowing lying posture where the jib mast 26 is inclined to the axis direction of the jib 6.

(3) In the first embodiment, the guide part 33 for guiding the jib-mast proximal end 36 may be in the form of a rail. For this case, it is preferable that the jib-mast proximal end 36 is formed as a clevis branched into two portions between which the rail-like guide part 33 can be fitted. The guide part 33, thus being in the form of a rail, can have a reduced width with respect to the right-left direction, allowed to have reduced weight.

(4) In the first embodiment, the lying-proximal-end holding part 27 is not necessarily limited to an arc-shaped one as described above. Specifically, the lying-proximal-end holding part 27 only has to be shaped so as to serve as a stopper configured to abut against the jib-mast proximal end 36, which is moved frontward along with the fall of the jib mast 26 from the uprise posture, at the predetermined position where the jib mast 26 is in the laid-down posture to thereby prevent the jib-mast proximal end 36 from further frontward movement while allowing the rotational movement for the jib-mast proximal end 36, permitting various forms of protrusions that protrudes from the guide part 33 backward thereof to be adopted as the lying-proximal-end holding part 27. Besides, the lying-proximal-end holding part 27 may be formed either integrally with the guide part 33 or separately from the guide part 33 to be attached to the guide part 33.

(5) In the first embodiment, a stopper may be provided at the end of the guide 33 on the side to the jib proximal end 17, the stopper configured to abut against the jib-mast proximal end 36 being moved backward along with the shift of the jib mast 26 from the laid-down posture to the uprise posture, at the position where the through-hole of the jib-mast proximal end 36 and the through-hole of the uprising-proximal-end support part 21 are aligned with each other, to prevent the jib-mast proximal end 36 from further backward movement. This configuration, allowing the through-hole of the jib-mast proximal end 36 and the through-hole of the uprising-proximal-end support part 21 to be facilely aligned, can facilitate the work for inserting the support pin 9 into the thus aligned through-holes to attach the jib-mast proximal end 36 to the uprising-proximal-end support part 21. The stopper may be either an arc-shaped one to receive the jib-mast proximal end 36 composed of a clevis like the lying-proximal-end holding part 27 in the first embodiment or selected one from various forms of projections each projecting backward of the guide 33 therefrom.

(6) Although the interposition of the frontward-rotational-movement stopper 28*a* between the jib mast 26 and the jib 6, in the second embodiment, is performed after the uprise of the contracted jib mast 26 to shift it to the looseness allowing form, in order to prevent the jib mast 26 in the looseness allowing from frontward rotational movement in the second embodiment, the interposition of the frontward-rotational-movement stopper 28*a* may be performed, alternatively, after the shift of the jib mast 26 to the uprise posture in the stretching state to shift the jib mast 26 to the tension form. In short, the interposition of the frontward-rotational-movement stopper 28*a* between the jib mast 26 and the jib 6 may be performed at the same stage as the interposition of the jib-mast back stop 29 between the jib mast 26 rendered in the tension form and the boom distal end 15.

(7) Although the upper mast member 63, in the second embodiment, is inserted to the inside of the lower mast member 62, it is also permissible, conversely, that the lower mast member 62 is inserted to the inside of the upper mast member 63, wherein the upper mast member 63 is movable frontward and backward relatively to the lower mast member 62 along the axis direction of the lower mast member 62 with the insertion of the lower mast member 62 inside the upper mast member 63.

(8) Although, in the third embodiment, the posture of the lower mast member 62 is retained by the interposition of the lower retainer 89 between the lower mast member 62 in the inclination posture and the jib 6 and the posture of the upper mast member 63 is retained by the interposition of the upper retainer 90 between the upper mast member 63 in the bending posture and the lower mast member 62, the retention of the posture of the lower mast member 62 by the lower retainer 89 and the retention of the posture of the upper mast member 63 by the upper retainer 90 are optional. It is also permissible to perform retaining of the upper mast member 63 in the bending posture and retaining the lower mast member 62 in the inclination posture only by the suspension of the upper-member distal end 81 by an auxiliary crane.

(9) The attachment object to which the jib mast is to be attached in the invention is not limited to the jib proximal end but also permitted to be the boom distal end.

(10) The uprising-proximal-end support part 21 may be also configured to be couplable with the rope connection part 24 provided at the distal end of the jib mast 26 which is being in the storage lying posture and configured to hold the jib mast 26 in the storage lying posture by the coupling with the rope connection part 24. This enables the uprising-proximal-end support part 21 to be used not only for supporting the jib-mast proximal end 36 which is being in the uprise posture but also holding the jib mast 26 which is being in the storage lying posture. This allows the number of members required to support the jib mast 26 in the uprise posture and to hold the jib mast 26 in the storage lying posture to be reduced, thereby allowing the manufacturing cost of the crane 100 to be reduced.

(11) Although, in the first embodiment, the disassembly of the crane 100 involves making the jib mast 26 fall down with the boom 5 and the jib 6 in the posture shown in FIG. 5, the shift of the posture of the jib mast 26 may be carried out while the boom 5 and the jib 6 are laid down along the ground as shown in FIGS. 2 to 4.

Specifically, it may be performed for the disassembly of the crane 100 to make the boom 5 and the jib 6 further fall down from the state shown in FIG. 5 to lay the boom 5 and the jib 6 along the ground as shown in FIG. 4 and to move, in the state, the jib-mast distal end 37 to the looseness allowing position as shown in FIG. 3 while supporting and suspending the jib-mast distal end 37 by an auxiliary crane to thereby shift the jib mast 26 to the looseness-allowing lying posture. At this time, it is preferable that the jib mast 26 is pushed by a worker at a position in the vicinity of the jib-mast proximal end 36 toward the lying-proximal-end holding part 27 to be assisted to fall down or that the posture of the jib mast 26 is guided by an auxiliary crane suspending the jib-mast distal end 37 so that the jib mast 26 falls down toward the looseness-allowing lying posture; these facilitate the shift of the jib mast 26 from the uprise posture to the looseness-allowing lying posture.

In the first embodiment, the guide part 33 may be attached to the jib 6 in such a posture that the guide part 33 is down-sloped frontward with the boom 5 and the jib 6 is laid down along the ground (so as to render the axis direction of the boom 5 and the axis direction of the jib 6 parallel to the ground surface) as shown in FIGS. 2 to 4. This enables the jib-mast proximal end 36 to be naturally moved from the uprising-proximal-end support part 21 to the lying-proximal-end holding part 27 along the slope of the guide 33 by the self-weight of the jib mast 26 in order to make the jib mast 26 fall down from the uprise posture while the boom 5 and the jib 6 is laid down along the ground.

(12) The boom derricking device 40 may include a known gantry in place of the boom mast 47. The gantry may allow the derricking winch of the boom derricking device 40 to be mounted on the gantry.

(13) The main winding winch 42 may be mounted on a so-called lower boom which is the closest section to the boom proximal end 14 in the boom 5 (boom body 11). Also the auxiliary winding winch 44 may be mounted on the lower boom.

Outline of Embodiment and Modification

The above-described embodiments and modifications can be outlined as follows.

The crane according to the embodiment and the modification includes: a crane body; a boom having a boom proximal end attached to the crane body rotatably about a boom rotation axis extending in a right-left direction of the crane body relatively to the crane body and a boom distal end opposite to the boom proximal end, the boom being capable of derricking with the boom proximal end as a fulcrum; a jib having a jib proximal end attached to the boom distal end rotatably about a jib rotation axis parallel to the boom rotation axis and a jib distal end opposite to the jib proximal end; and a jib posture retention device that retains the jib in a predetermined frontward tilt posture with respect to the boom when the boom has uprisen. The boom has a rope connection place at a position separate from the boom distal end toward the boom proximal end. The jib posture retention device includes: a jib-side support rope having one end connected to the jib distal end and the other end opposite to the one end; a boom-side support rope having one end connected to the rope connection place of the boom and the other end opposite to the one end: a rope connection part to which the other end of the jib-side support rope and the other end of the boom-side support rope are separably connected; and a jib mast that supports the jib in a predetermined frontward tilt posture in cooperation with the jib-side support rope and the boom-side support rope on a back side of the jib, by holding the rope connection part at a tensioning position while the jib mast is attached to an attachment object that is one of the boom distal end and the jib proximal end when the jib is in the predetermined frontward tilt posture. The tensioning position is a position at which the rope connection part is separated from the jib proximal end and the boom distal end backward of the jib proximal end and the boom distal end to an extent that the jib-side support rope is linearly tensioned between the rope connection part and the rope connection place and the boom-side support rope is linearly tensioned between the rope connection part and the rope connection place of the boom. The jib mast is configured to be shiftable to any of a tension form of holding the rope connection part at the tensioning position in an uprise posture in which the jib mast extends from the attachment object backward of the attachment object and a looseness allowing form of locating the rope connection part at a looseness allowing position. The looseness allowing position is a position closer to the boom distal end than the tensioning position and closer to the jib proximal end than the tensioning position to allow the jib-side support rope and the boom-side support rope to be loosened.

In the crane, the jib-side support rope and the boom-side support rope is enabled to be installed without performing heavy work of drawing the heavy-labor rope and enables the installation work to be performed at a relatively low place, by the shift of the rope connection part to the looseness allowing form with the boom and the jib lying down. Besides, the tension on the jib-side support rope and the boom-side support rope is enabled to be released to allow the ropes to be removed from the jib-side support rope and the boom-side support rope without requiring a large amount of labor and the removal work is enabled to be performed at a relatively low place, by the shift of the rope connection part to the looseness allowing form to locate the rope connection part at the looseness allowing position. These allow the burden on a worker involved in the work of installing the jib-side support rope and the boom-side support rope and the burden on a worker involved in the work of removing the installed jib-side support rope and the boom-side support rope to be reduced.

Specifically, the crane allows the jib mast to be shifted to the looseness allowing form to locate the rope connection part at the looseness allowing position closer to the tensioning position to render each of the jib-side support rope and the boom-side support rope connected to the rope connection part linearly tensioned and closer to the jib proximal end than the tensioning position to allow the jib-side support rope and the boom-side support rope to be loosened. This allows the height position of the rope connection part located at the looseness allowing position from the ground to be reduced as compared with the height position from the ground in the assumed case where the rope connection part would be located at the tensioning position, and allows the rope connection part to be close to the jib distal end with a distance smaller than the length of the jib-side support rope, and allows the rope connection part to be close to the rope connection place of the boom with a distance smaller than the length of the boom-side support rope, by shifting the jib mast to the looseness allowing form with the boom and the jib lying down to locate the rope connection part at the looseness allowing position. Hence, when the jib-side support rope is disposed so as to extend from the rope connection part located at the looseness allowing position to the jib distal end and the jib-side support rope is connected to the rope connection part of the looseness allowing position, one end of the jib-side support rope can be restrained from approaching the rope connection part to be largely separated from the jib distal end due to the suspension of the jib-side support rope from the rope connection part. This makes it possible to connect the one end of the jib-side support rope to the jib distal end without largely drawing the one end of the jib-side support rope toward the jib distal end. Besides, when the boom-side support rope is disposed so as to extend from the rope connection part located at the looseness allowing position to the rope connection place of the boom and the boom-side support rope is connected to the rope connection part at the looseness-allowing position, one end of the boom-side support rope can be restrained from approaching the rope-connection-part to be largely separated from the rope connection place of the boom due to the suspension of the boom-side support rope from the rope connection part. This makes it possible to connect the one end of the boom-side support rope to the rope connection place of the boom without largely drawing the one end of the boom-side support rope toward the rope connection place of the boom. Thus, the burden on a worker can be reduced in the work of installing the jib-side support rope between the rope connection part provided on the jib mast and the distal end of the jib and the work of installing the boom-side support rope between the rope connection part provided on the jib mast and the rope connection place of the boom.

Besides, for the removal of the boom-side support rope installed between the rope connection part provided on the jib mast and the jib distal end and the removal of the boom-side support rope installed between the rope connection part provided on the jib mast and the rope connection place of the boom, the shift of the jib mast to the looseness allowing form similarly to the installation of the ropes makes it possible to loosen the jib-side support rope to release the tension on the jib-side support rope and to loosen the jib-side support rope to release the tension on the boom-side support rope. In this state, no large tension on the jib-side support rope is applied to either of the rope connection part and the jib distal end provided on the jib mast, and no large tension on the boom-side support rope is applied to either of the rope connection part and the rope connection place of the boom provided on the jib mast. A worker is thereby allowed to facilely release the connection of the jib-side support rope to the jib distal end without pulling the jib-side support rope toward the jib distal end against a large tension on the jib-side support rope and to facilely release the connection of the jib-side support rope to the rope connection part without pulling the jib-side support rope toward the rope connection part of the jib mast against a large tension on the jib-side support rope. A worker is also allowed to facilely release the connection of the boom-side support rope to the rope connection place without pulling the boom-side support rope to the rope-connection-place side of the boom against a large tension on the boom-side support rope and to facilely release the connection of the boom-side support rope to the rope connection part without pulling the boom-side support rope toward the rope connection part of the jib mast against a large tension on the boom-side support rope. Thus, can be reduced the burden on a worker in the work of removing the jib-side support rope installed between the rope connection part provided on the jib mast and the distal end of the jib and the work of removing the boom-side support rope installed between the rope connection part provided on the jib mast and the rope connection place of the boom.

In addition, rendering the jib mast in the looseness form with the boom and the jib laid down as described above to locate the rope connection part at the looseness allowing position enables the height position of the rope connection part from the ground to be reduced. This allows the work of connecting the jib-side support rope and the boom-side support rope to the rope connection part provided on the jib mast for installing the jib-side support rope and the boom-side support rope to be performed at a relatively low place, and enables the work of releasing the connection of each of the jib-side support rope and the boom-side support rope to the rope connection part provided on the jib mast for removing the installed jib-side support rope and the boom-side support rope to be performed at a relatively low place. This also allows the burden on a worker involved in the work of installing the jib-side support rope and the boom-side support rope and the work of removing the installed jib-side support rope and the boom-side support rope to be reduced.

It is preferable that: the jib mast has a jib-mast distal end that is one end on which the rope connection part is provided and a jib-mast proximal end that is an end opposite to the jib distal end; the attachment object includes an uprising-proximal-end support part that is separably connected to the jib-mast proximal end and supports the jib-mast proximal end when the jib mast is in the uprise posture; in the looseness allowing forms, the jib mast is in a looseness-allowing lying posture in which the jib mast is laid down so that the jib-mast distal end is located at a position closer to the boom distal end than the jib-mast proximal end and the jib-mast proximal end is closer to the jib distal end than the jib-mast distal end while the rope connection part is located at the looseness allowing position; the jib posture retention device includes a lying-proximal-end holding part attached to the jib, the lying-proximal-end holding part configured to hold the jib-mast proximal end, at a position separate from the jib proximal end toward the jib distal end, so as to prevent the jib-mast proximal end from movement toward the jib distal end when the jib mast is in the looseness-allowing lying posture.

This mode enables the jib mast to be retained in the uprise posture by the support of the uprising proximal end by the uprising-proximal-end support part and enables the jib mast to be retained in the looseness-allowing lying posture by the hold of the jib-mast proximal end by the lying-proximal-end holding part. A specific configuration, thus, can be provided for rendering the jib mast in any of the uprise posture and the looseness-allowing lying posture.

Preferably, the jib posture retention device further includes a guide part attached to the jib, the guide part configured to guide a movement of the jib-mast proximal end from the uprising-proximal-end support part to the lying-proximal-end holding part when the jib mast is shifted from the uprise posture to the looseness-allowing lying posture and configured to guide a movement of the jib-mast proximal end from the lying-proximal-end holding part to the uprising-proximal-end support part when the jib mast is shifted from the looseness-allowing lying posture to the uprise posture.

The guide part, which guides the movement of the uprise posture proximal end from one of the uprising-proximal-end support part and the lying-proximal-end holding part to the other when the jib mast is shifted from one of the uprise posture and the looseness-allowing lying posture to the other, enables the jib mast to be smoothly shifted between the uprise posture and the looseness-allowing lying posture.

Preferably, the guide part is attached to the jib in such a posture that the guide part is down-sloped frontward when the boom is laid down and the jib is laid down with respect to the boom to the extent that the jib distal end is brought into contact with the ground surface while the jib-side support rope is linearly tensioned between the rope connection part and the jib distal end and the jib-side support rope is linearly tensioned between the rope connection part and the rope connection place of the boom.

This configuration allows the jib-mast proximal end, when the jib mast falls down from the uprise posture so as to loosen the jib-side support rope and the boom-side support rope in the state where the ropes are linearly tensioned while the boom is laid down and the jib is laid down with respect to the boom so as to bring the jib distal end into contact with the ground, to be naturally moved from the uprising-proximal-end support part to the front lying-proximal-end holding part along the slope of the guide part by the self-weight of the jib mast. This allows the jib mast to be naturally shifted to the looseness-allowing lying posture, thereby allowing the burden on a worker involved in the work of shifting the jib mast from the uprise posture to the looseness-allowing lying posture to be reduced.

Preferably, the lying-proximal-end holding part is configured to allow the jib mast to be in a storage lying posture in which the jib mast extends from the lying-proximal-end holding part toward the boom distal end along the jib with the jib-mast proximal end held by the lying-proximal-end holding part, and the uprising-proximal-end support part is configured to be connectable to the rope connection part so as to hold the rope connection part when the jib mast is in the storage lying posture.

This enables the lying-proximal-end holding part to be used not only for holding the jib-mast proximal end when the jib mast is in the looseness-allowing posture but also for holding the jib-mast proximal end when the jib mast is in the storage lying posture. Besides, the uprising-proximal-end support is enabled to be used not only for supporting the jib-mast proximal end when the mast is in the uprise posture but also for holding the rope connection part provided at the distal end of the jib mast when the mast is in the storage lying posture. Thus can be reduced the number of members required to hold the jib mast in each of the looseness-allowing lying posture and the storage lying posture and to support the jib mast in the uprise posture, allowing the manufacturing cost of the crane to be reduced.

It is preferable that the looseness-allowing lying posture of the jib mast is a posture where the jib mast is inclined to an axis direction of the jib so as to go away from the jib as the jib mast extends from the jib-mast proximal end toward the jib-mast distal end, and the jib posture retention device further includes a mast posture retaining member to be interposed between the jib mast in the looseness-allowing lying posture and the jib to retain the jib mast in the looseness-allowing lying posture.

This configuration enables the jib mast to be retained in the looseness-allowing lying posture by the mast holding member interposed between the mast and the jib when the jib mast is in the looseness-allowing lying posture in which the jib mast is inclined as described above. This makes it possible to hold the jib mast in the looseness-allowing lying posture more stably, for example, as compared with the case where the jib mast is retained in the looseness-allowing lying posture only by the suspension of the jib-mast distal end by an auxiliary crane or the like.

The mast posture retaining member is preferably configured to be interposable between the jib mast in the uprise posture and the jib so as to prevent the jib mast from rotational movement about the jib-mast proximal end in a direction to be laid along the jib.

This enables the mast posture retaining member to be used not only for retaining the jib mast in the looseness-allowing lying posture but also for holding the jib mast in the uprise posture. Thus can be reduced the number of members required to retain the jib mast in each of the looseness-allowing lying posture and the uprise posture, thereby allowing the manufacturing cost of the crane to be reduced.

It is also preferable that: the jib mast includes a lower mast member attached to the attachment object rotatably about an axis parallel to the jib rotation axis and an upper mast member attached to the lower mast member so as to be protrusible from and retractable into the lower mast member; the rope connection part is provided on the upper mast member; the tension form of the jib mast is a state where the lower mast member is in a posture of extending from the attachment object backward of the attachment object and the upper mast member has been protruded from the lower mast member to a protrusion position, which is a position to locate the rope connection part at the tensioning position; the looseness allowing form of the jib mast is a state where the lower mast member is in a posture of extending from the attachment object backward of the attachment object and the upper mast member has been retracted into the lower mast member to a retraction position, which is a position to locate the rope connection part at the looseness allowing position.

This enables the jib mast shiftable to any of the tension form and the looseness allowing form through the expansion and contraction thereof to be constituted by the lower mast member and the upper mast member protrusible from and retractable into the lower mast member.

In this mode, preferably, the jib mast further includes a position fixing member that fixes the upper mast member having been protruded to the protrusion position to the lower mast member at the protrusion position.

This configuration makes it possible to fix the upper mast member having been protruded to the protrusion position to the lower mast member at the protrusion position by the position fixing member to thereby retain the jib mast in the tension form.

Preferably, the jib mast further includes a protrusion prevention unit that prevents the upper mast member from protrusion from the lower mast member beyond the protrusion position.

The configuration enables the upper mast member having protruded to the protrusion position to be prevented from protrusion from the lower mast member beyond the protrusion position by the protrusion prevention unit. This enables the upper mast member to be prevented from being accidentally disengaged out of the lower mast member by excessive protrusion of the upper mast member from the lower mast member.

It is also preferable that: the jib mast includes a lower mast member attached to the attachment object rotatably about an axis parallel to the jib rotation axis and an upper mast member connected to the lower mast member rotatably about an axis parallel to the jib rotation axis; the rope connection part is provided on the upper mast member; the tension form of the jib mast is a state where the lower mast member extends from the attachment object backward of the attachment object and the upper mast member is in a stretching posture of extending along the extension of the lower mast member in the same direction as the lower mast member; the looseness allowing form of the jib mast is a state where the lower mast member is in an inclination posture of extending so as to go away from the jib backward of the jib from the attachment object toward the jib distal end and the upper mast member is in a bending posture of extending so as to further go away from the jib backward of the jib from a connection place, at which the upper lower member is connected to the lower mast member, toward the boom distal end.

This enables the jib mast shiftable to any of the tension form and the looseness allowing form through the stretching and bending thereof to be constituted by the lower n-last member and the upper mast member attached to the lower mast member rotatably about the axis parallel to the jib rotation axis.

In this mode, preferably, the jib mast further includes a posture fixing member that fixes the upper mast member to the lower mast member in the stretching posture.

This configuration can fix the upper mast member which comes to the stretching posture to the lower mast member in the stretching posture by the posture fixing member to thereby retain the jib mast in the tension form.

Preferably, the jib mast further includes a rotational-movement prevention part provided on one of the lower mast member and the upper mast member, the rotational-movement prevention part configured to prevent the upper mast member from rotational movement to a side opposite to the bending posture beyond the stretching posture.

According to this configuration, when the rope connection part is lowered to the looseness allowing position for disassembly of the crane from the tensioning position in the state where the upper mast member is in the stretching posture and the jib mast is in the uprise posture of extending upward from the attachment object part with the boom and the jib lying down so as to extend frontward from the turning body, the upper mast member can be prevented from rotational movement in the direction opposite to the bending posture by the rotational-movement prevention part. This makes it possible to move the upper mast member rotationally in the intended direction to shift the upper mast member to the bending posture when the rope connection part is lowered to the looseness allowing position.

Preferably, the jib posture retention device further includes a retainer that retains a posture of the lower mast member to the jib and retains a posture of the upper mast member to the lower mast member when the lower mast member is in the inclination posture and the upper mast member is in the bending posture.

This configuration allows the lower mast member to be retained in the inclination posture and allows the upper mast member to be retained in the bending posture, by the retainer. This enables the upper mast member to be retained in the bending posture more stably and enables the lower mast member to be retained in the inclination posture more stably as compared with, for example, the case where the upper mast member is retained in the bending posture and the lower mast member is retained in the inclination posture only by the suspension of the upper mast member by an auxiliary crane. The rope connection part is, thus, enabled to be retained in the looseness allowing position more stably, which facilitates the connection operation of the jib-side support rope and the boom-side support rope.

Preferably, the retainer includes a lower retainer to be interposed between the lower mast member in the inclination posture and the jib so as to prevent the lower mast member from rotational movement in a direction to approach the jib from the inclination posture and an upper retainer to be interposed between the upper mast member in the bending posture and the lower mast member so as to prevent the upper mast member from rotational movement in a direction to approach the lower mast member from the bending posture.

Thus is specifically provided the retainer for retaining the lower mast member in the inclination posture and retaining the upper mast member in the bending posture.

Preferably, the lower retainer is configured to be interposable between the jib mast in the uprise posture and the jib so as to prevent the jib mast from rotational movement in a direction to be laid along the jib and the upper retainer is configured to be interposable between the jib mast in the uprise posture and the boom distal end so as to prevent the jib mast from rotational movement in a direction opposite to the direction to be laid along the jib.

This enables the lower retainer to be used not only for preventing the lower mast member in the inclination posture from rotational movement in the direction to approach the jib from the inclination posture but also as a stopper for preventing the jib mast in the uprise posture from rotational movement in the direction to be laid along the jib. Also, the upper retainer is enabled to be used not only for preventing the upper mast member in the bending posture from rotational movement in a direction to approach the lower mast member from the bending posture but also as a jib-mast back stop for preventing the jib mast in the uprise posture from rotational movement in the direction opposite to the direction to be laid along the jib. Thus can be reduced the number of members required for retaining the lower mast member in the inclination posture, retaining the upper mast member in the bending posture and retaining the jib mast in the uprise posture, allowing the manufacturing cost of the crane to be reduced.

The method of assembling the crane according to the embodiment and the modification includes: a step of attaching the boom proximal end to the crane body and placing the boom in a posture of lying down so as to extend frontward from the crane body; a step of attaching the jib proximal end to the boom distal end of the boom lying down and placing the jib in a posture of lying down so as to extend frontward from the boom distal end; a step of rendering the jib mast in the looseness allowing form to thereby locate the rope connection part at the looseness allowing position; a step of connecting one end of the jib-side support rope to the jib distal end of the jib lying down and connecting the other end of the jib-side support rope to the rope connection part located at the looseness allowing position to thereby install the jib-side support rope between the jib distal end and the rope connection part; a step of connecting one end of the boom-side support rope to the rope connection place of the boom lying down and connecting the other end of the boom-side support rope to the rope connection part located at the looseness allowing position to thereby install the boom-side support rope between the rope connection place of the boom and the rope connection part; a step of shifting the jib mast from the looseness allowing form to the tension form to thereby move the rope connection part, to which the other end of the jib-side support rope and the other end of the boom-side support rope are connected, from the looseness allowing position to the tensioning position; a step of raising the boom so as to bring the jib into the predetermined frontward tilt posture to render the jib-side support rope linearly tensioned between the jib distal end and the rope connection part located at the tensioning position and to render the jib-side support rope linearly tensioned between the rope connection place of the boom and the rope connection part located at the tensioning position, thereby making the jib in the predetermined frontward tilt posture be supported by the jib-side support rope, the boom-side support rope and the jib mast on a back side of the jib to retain the jib in the predetermined frontward tilt posture.

This assembly method can reduce the burden on a worker involved in the work of installing the jib-side support rope and the boom-side support rope for the same reason as the reason why the burden on a worker involved in the work of installing the jib-side support rope and the boom-side support rope can be reduced by the configuration of the crane.

Besides, the method of assembling the crane according to the embodiment and the modification includes: a step of attaching the boom proximal end to the crane body and placing the boom in a posture of lying down so as to extend frontward from the crane body; a step of attaching the jib proximal end to the boom distal end of the boom lying down and placing the jib in a posture of lying down so as to extend frontward from the boom distal end; a step of rendering the jib mast in the looseness allowing form to thereby locate the rope connection part at the looseness allowing position; a step of connecting one end of the jib-side support rope to the jib distal end of the jib lying down and connecting the other end of the jib-side support rope to the rope connection part located at the looseness allowing position to thereby install the jib-side support rope between the jib distal end and the rope connection part; a step of connecting one end of the boom-side support rope to the rope connection place of the boom lying down and connecting the other end of the boom-side support rope to the rope connection part located at the looseness allowing position to thereby install the boom-side support rope between the rope connection place of the boom and the rope connection part; a step of shifting the jib mast from the looseness allowing form to the tension form to thereby move the rope connection part, to which the other end of the jib-side support rope and the other end of the boom-side support rope are connected, from the looseness allowing position to the tensioning position; a step of raising the boom so as to bring the jib into the predetermined frontward tilt posture to render the jib-side support rope linearly tensioned between the jib distal end and the rope connection part located at the tensioning position and to render the jib-side support rope linearly tensioned between the rope connection place of the boom and the rope connection part located at the tensioning position, thereby making the jib in the predetermined frontward tilt posture be supported by the jib-side support rope, the boom-side support rope and the jib mast on a hack side of the jib to retain the jib in the predetermined frontward tilt posture, wherein the step of rendering the jib mast in the looseness allowing form to thereby locate the rope connection part at the looseness allowing position may include rendering the jib mast in the looseness-allowing lying posture and making the lying-proximal-end holding part hold the jib-mast proximal end, and the step of shifting the jib mast from the looseness allowing form to the tension form to thereby move the rope connection part from the looseness allowing position to the tensioning position may include shifting the jib mast from the looseness-allowing lying posture to the uprise posture and making the uprising-proximal-end support part support the jib-mast proximal end of the jib mast having been shifted to the uprise posture.

The method of assembling the crane according to the embodiment and the modification includes: a step of attaching the boom proximal end to the crane body and placing the boom in a posture of lying down so as to extend frontward from the crane body; a step of attaching the jib proximal end to the boom distal end of the boom lying down and placing the jib in a posture of lying down so as to extend frontward from the boom distal end; a step of rendering the jib mast in the looseness allowing form to thereby locate the rope connection part at the looseness allowing position; a step of connecting one end of the jib-side support rope to the jib distal end of the jib lying down and connecting the other end of the jib-side support rope to the rope connection part located at the looseness allowing position to thereby install the jib-side support rope between the jib distal end and the rope connection part; a step of connecting one end of the boom-side support rope to the rope connection place of the boom lying down and connecting the other end of the boom-side support rope to the rope connection part located at the looseness allowing position to thereby install the boom-side support rope between the rope connection place of the boom and the rope connection part; a step of shifting the jib mast from the looseness allowing form to the tension form to thereby move the rope connection part, to which the other end of the jib-side support rope and the other end of the boom-side support rope are connected, from the looseness allowing position to the tensioning position; a step of raising the boom so as to bring the jib into the predetermined frontward tilt posture to render the jib-side support rope linearly tensioned between the jib distal end and the rope connection part located at the tensioning position and to render the jib-side support rope linearly tensioned between the rope connection place of the boom and the rope connection part located at the tensioning position, thereby making the jib in the predetermined frontward tilt posture be supported by the jib-side support rope, the boom-side support rope and the jib mast on a back side of the jib to retain the jib in the predetermined frontward tilt posture, wherein the step of rendering the jib mast in the looseness allowing form to thereby locate the rope connection part at the looseness allowing position may include rendering the lower mast member in a posture of extending from the attachment object backward of the attachment object and retracting the upper mast member into the lower mast member to the retraction position, and the step of shifting the jib mast from the looseness allowing form to the tension form to thereby move the rope connection part from the looseness allowing position to the tensioning position may include protruding the upper mast member from the lower mast member to the protrusion position while rendering the lower mast member in a posture of extending from the attachment object backward of the attachment object.

Besides, the method of assembling the crane according to the embodiment and the modification includes: a step of attaching the boom proximal end to the crane body and placing the boom in a posture of lying down so as to extend frontward from the crane body; a step of attaching the jib proximal end to the boom distal end of the boom lying down and placing the jib in a posture of lying down so as to extend frontward from the boom distal end; a step of rendering the jib mast in the looseness allowing form to thereby locate the rope connection part at the looseness allowing position; a step of connecting one end of the jib-side support rope to the jib distal end of the jib lying down and connecting the other end of the jib-side support rope to the rope connection part located at the looseness allowing position to thereby install the jib-side support rope between the jib distal end and the rope connection part; a step of connecting one end of the boom-side support rope to the rope connection place of the boom lying down and connecting the other end of the boom-side support rope to the rope connection part located at the looseness allowing position to thereby install the boom-side support rope between the rope connection place of the boom and the rope connection part; a step of shifting the jib mast from the looseness allowing form to the tension form to thereby move the rope connection part, to which the other end of the jib-side support rope and the other end of the boom-side support rope are connected, from the looseness allowing position to the tensioning position; a step of raising the boom so as to bring the jib into the predetermined frontward tilt posture to render the jib-side support rope linearly tensioned between the jib distal end and the rope connection part located at the tensioning position and to render the jib-side support rope linearly tensioned between the rope connection place of the boom and the rope connection part located at the tensioning position, thereby making the jib in the predetermined frontward tilt posture be supported by the jib-side support rope, the boom-side support rope and the jib mast on a hack side of the jib to retain the jib in the predetermined frontward tilt posture, wherein the step of rendering the jib mast in the looseness allowing form to thereby locate the rope connection part at the looseness allowing position may include rendering the lower mast member in the inclination posture and rendering the upper mast member in the bending posture, and the step of shifting the jib mast from the looseness allowing form to the tension form to thereby move the rope connection part from the looseness allowing position to the tensioning position may include rendering the lower mast member in a posture of extending from the attachment object backward of the attachment object and rendering the upper mast member in the stretching posture.

The method of disassembling the crane according to the embodiment and the modification includes: a step of laying down the boom and the jib so that the boom extends frontward from the crane body and the jib extends frontward from the boom distal end of the boom; a step of shifting the jib mast from the tension form to the looseness allowing form to thereby move the rope connection part, to which the other end of the jib-side support rope and the other end of the boom-side support rope are connected, from the tensioning position to the looseness allowing position; a step of removing one end of the jib-side support rope from the jib distal end of the jib lying down and removing the other end of the jib-side support rope from the rope connection part located at the looseness allowing position; a step of removing one end of the boom-side support rope from the rope connection place of the boom lying down and removing the other end of the boom-side support rope from the rope connection part located at the looseness allowing position; a step of removing the jib proximal end from the boom distal end of the boom lying down to thereby separating the jib from the boom; and a step of removing the boom proximal end of the boom lying down from the crane body to thereby separate the boom from the crane body.

This assembly method can reduce the burden on a worker involved in the work of removing the installed jib-side support rope and the installed boom-side support rope for the same reason as the reason why the burden on a worker involved in the work of removing the installed jib-side support rope and the installed boom-side support rope can be reduced by the configuration of the crane.

Besides, the method of disassembling the crane according to the embodiment and the modification includes: a step of laying down the boom and the jib so that the boom extends frontward from the crane body and the jib extends frontward from the boom distal end of the boom; a step of shifting the jib mast from the tension form to the looseness allowing form to thereby move the rope connection part, to which the other end of the jib-side support rope and the other end of the boom-side support rope are connected, from the tensioning position to the looseness allowing position; a step of removing one end of the jib-side support rope from the jib distal end of the jib lying down and removing the other end of the jib-side support rope from the rope connection part located at the looseness allowing position; a step of removing one end of the boom-side support rope from the rope connection place of the boom lying down and removing the other end of the boom-side support rope from the rope connection part located at the looseness allowing position; a step of removing the jib proximal end from the boom distal end of the boom lying down to thereby separating the jib from the boom; and a step of removing the boom proximal end of the boom lying down from the crane body to thereby separate the boom from the crane body, wherein the step of shifting the jib mast from the tension form to the looseness allowing form to thereby move the rope connection part from the tensioning position to the looseness allowing position may include removing the jib-mast proximal end of the jib mast in the uprise posture from the uprising-proximal-end support part and thereafter shifting the jib mast from the uprise posture to the looseness-allowing lying posture to make the lying-proximal-end holding part hold the jib-mast proximal end.

Besides, the method of disassembling the crane according to the embodiment and the modification includes: a step of laying down the boom and the jib so that the boom extends frontward from the crane body and the jib extends frontward from the boom distal end of the boom; a step of shifting the jib mast from the tension form to the looseness allowing form to thereby move the rope connection part, to which the other end of the jib-side support rope and the other end of the boom-side support rope are connected, from the tensioning position to the looseness allowing position; a step of removing one end of the jib-side support rope from the jib distal end of the jib lying down and removing the other end of the jib-side support rope from the rope connection part located at the looseness allowing position; a step of removing one end of the boom-side support rope from the rope connection place of the boom lying down and removing the other end of the boom-side support rope from the rope connection part located at the looseness allowing position; a step of removing the jib proximal end from the boom distal end of the boom lying down to thereby separating the jib from the boom; and a step of removing the boom proximal end of the boom lying down from the crane body to thereby separate the boom from the crane body, wherein the step of shifting the jib mast from the tension form to the looseness allowing form to thereby move the rope connection part from the tensioning position to the looseness allowing position may include retracting the upper mast member into the lower mast member from the protrusion position to the retraction position while rendering the lower mast member in a posture of extending from the attachment object backward of the attachment object.

Besides, the method of disassembling the crane according to the embodiment and the modification includes: a step of laying down the boom and the jib so that the boom extends frontward from the crane body and the jib extends frontward from the boom distal end of the boom; a step of shifting the jib mast from the tension form to the looseness allowing form to thereby move the rope connection part, to which the other end of the jib-side support rope and the other end of the boom-side support rope are connected, from the tensioning position to the looseness allowing position; a step of removing one end of the jib-side support rope from the jib distal end of the jib lying down and removing the other end of the jib-side support rope from the rope connection part located at the looseness allowing position; a step of removing one end of the boom-side support rope from the rope connection place of the boom lying down and removing the other end of the boom-side support rope from the rope connection part located at the looseness allowing position; a step of removing the jib proximal end from the boom distal end of the boom lying down to thereby separating the jib from the boom; and a step of removing the boom proximal end of the boom lying down from the crane body to thereby separate the boom from the crane body, wherein the step of shifting the jib mast from the tension form to the looseness allowing form to thereby move the rope connection part from the tensioning position to the looseness allowing position may include shifting the lower mast member in a posture of extending from the attachment object backward of the attachment object to the inclination posture and shifting the upper mast member in the stretching posture to the bending posture.

According to the above embodiment and the above modification example, thus, the burden on a worker involved in the work of installing the jib-side support rope and the work of removing the installed jib-side support rope can be reduced, and the burden on a worker involved in the work of installing the boom-side support rope and the work of removing the installed boom-side support rope can also be reduced.

The invention claimed is:

1. A crane comprising:

a crane body;

a boom having a boom proximal end attached to the crane body rotatably about a boom rotation axis extending in a right-left direction of the crane body relatively to the crane body and a boom distal end opposite to the boom proximal end, the boom being capable of derricking with the boom proximal end as a fulcrum;

a jib having a jib proximal end attached to the boom distal end rotatably about a jib rotation axis parallel to the boom rotation axis and a jib distal end opposite to the jib proximal end; and a jib posture retention device that retains the jib in a predetermined frontward tilt posture with respect to the boom when the boom has uprisen, wherein:

the boom has a rope connection place at a position separate from the boom distal end toward the boom proximal end;

the jib posture retention device includes: a jib-side support rope having one end connected to the jib distal end and the other end opposite to the one end; a boom-side support rope having one end connected to the rope connection place of the boom and the other end opposite to the one end; a rope connection part to which the other end of the jib-side support rope and the other end of the boom-side support rope are separably directly connected; and a jib mast that supports the jib in a predetermined frontward tilt posture in cooperation with the jib-side support rope and the boom-side support rope on a back side of the jib, by holding the rope connection part at a tensioning position while the jib mast is attached to an attachment object that is one of the boom distal end and the jib proximal end, when the jib is in the predetermined frontward tilt posture, the tensioning position being a position at which the rope connection part is separated from the jib proximal end and the boom distal end backward of the jib proximal end and the boom distal end to an extent that the jib-side support rope is linearly tensioned between the rope connection part and the jib distal end and the boom-side support rope is linearly tensioned between the rope connection part and the rope connection place of the boom; and the jib mast is configured to be shiftable between a tension form of holding the rope connection part at the tensioning position in an uprise posture in which the jib mast extends from the attachment object backward of the attachment object and a looseness allowing form of locating the rope connection part at a looseness allowing position, which is a position closer to the boom distal end than the tensioning position and closer to the jib proximal end than the tensioning position to allow the jib-side support rope and the boom-side support rope to be loosened, while keeping the rope connection part along with the jib-side support rope and the boom-side support rope, attached to the jib mast.

2. The crane according to claim 1, wherein:

the jib mast has a jib-mast distal end that is one end on which the rope connection part is provided and a jib-mast proximal end that is an end opposite to the jib distal end;

the attachment object includes an uprising-proximal-end support part that is separably connected to the jib-mast proximal end and supports the jib-mast proximal end when the jib mast is in the uprise posture;

in the looseness allowing forms, the jib mast is in a looseness-allowing lying posture in which the jib mast is laid down so that the jib-mast distal end is located at a position closer to the boom distal end than the jib-mast proximal end and the jib-mast proximal end is located at a position closer to the jib distal end than the jib-mast distal end while the rope connection part is located at the looseness allowing position; and the jib posture retention device includes a lying-proximal-end holding part attached to the jib, the lying-proximal-end holding part configured to hold the jib-mast proximal end, at a position separate from the jib proximal end toward the jib distal end, so as to prevent the jib-mast proximal end from movement toward the jib distal end when the jib mast is in the looseness-allowing lying posture.

3. The crane according to claim 2, wherein the jib posture retention device further includes a guide part attached to the jib, the guide part configured to guide a movement of the jib-mast proximal end from the uprising-proximal-end support part to the lying-proximal-end holding part when the jib mast is shifted from the uprise posture to the looseness-allowing lying posture and configured to guide a movement of the jib-mast proximal end from the lying-proximal-end holding part to the uprising-proximal-end support part when the jib mast is shifted from the looseness-allowing lying posture to the uprise posture.

4. The crane according to claim 3, wherein the guide part is attached to the jib in such a posture that the guide part is down-sloped frontward when the boom is laid down and the jib is laid down with respect to the boom to an extent that the jib distal end is brought into contact with the ground while the jib-side support rope is linearly tensioned between the rope connection part and the jib distal end and the jib-side support rope is linearly tensioned between the rope connection part and the rope connection place of the boom.

5. The crane according to claim 2, wherein:

the lying-proximal-end holding part is configured to allow the jib mast to be in a storage lying posture in which the jib mast extends from the lying-proximal-end holding part toward the boom distal end along the jib with the jib-mast proximal end held by the lying-proximal-end holding part; and the uprising-proximal-end support part is configured to be connectable to the rope connection part so as to hold the rope connection part when the jib mast is in the storage lying posture.

6. The crane according to claim 2, wherein:

the looseness-allowing lying posture of the jib mast is a posture where the jib mast is inclined to an axis direction of the jib so as to go away from the jib as the jib mast extends from the jib-mast proximal end toward the jib-mast distal end; and the jib posture retention device further includes a mast posture retaining member to be interposed between the jib mast in the looseness-allowing lying posture and the jib to retain the jib mast in the looseness-allowing lying posture.

7. The crane according to claim 6, wherein the mast posture retaining member is configured to be interposable between the jib mast in the uprise posture and the jib so as to prevent the jib mast from rotational movement about the jib-mast proximal end in a direction to be laid along the jib.

8. A method of assembling the crane according to claim 2, comprising:

a step of attaching the boom proximal end to the crane body and placing the boom in a posture of lying down so as to extend frontward from the crane body;

a step of attaching the jib proximal end to the boom distal end of the boom lying down and placing the jib in a posture of lying down so as to extend frontward from the boom distal end;

a step of rendering the jib mast in the looseness allowing form to thereby locate the rope connection part at the looseness allowing position;

a step of connecting one end of the jib-side support rope to the jib distal end of the jib lying down and connecting the other end of the jib-side support rope to the rope connection part located at the looseness allowing position to thereby install the jib-side support rope between the jib distal end and the rope connection part;

a step of connecting one end of the boom-side support rope to the rope connection place of the boom lying down and connecting the other end of the boom-side support rope to the rope connection part located at the looseness allowing position to thereby install the boom-side support rope between the rope connection place of the boom and the rope connection part;

a step of shifting the jib mast from the looseness allowing form to the tension form to thereby move the rope connection part, to which the other end of the jib-side support rope and the other end of the boom-side support rope are connected, from the looseness allowing position to the tensioning position while keeping the rope connection part attached to the jib mast; and a step of raising the boom so as to bring the jib into the predetermined frontward tilt posture to render the jib-side support rope linearly tensioned between the jib distal end and the rope connection part located at the tensioning position and to render the boom-side support rope linearly tensioned between the rope connection place of the boom and the rope connection part located at the tensioning position, thereby making the jib in the predetermined frontward tilt posture be supported by the jib-side support rope, the boom-side support rope and the jib mast on a back side of the jib to retain the jib in the predetermined frontward tilt posture, wherein:

the step of rendering the jib mast in the looseness allowing form to thereby locate the rope connection part at the looseness allowing position includes rendering the jib mast in the looseness-allowing lying posture and making the lying-proximal-end holding part hold the jib-mast proximal end; and the step of shifting the jib mast from the looseness allowing form to the tension form to thereby move the rope connection part from the looseness allowing position to the tensioning position includes shifting the jib mast from the looseness-allowing lying posture to the uprise posture and making the uprising-proximal-end support part support the jib-mast proximal end of the jib mast having been shifted to the uprise posture.

9. A method of disassembling the crane according to claim 2, comprising:

a step of laying down the boom and the jib so that the boom extends frontward from the crane body and the jib extends frontward from the boom distal end of the boom;

a step of shifting the jib mast from the tension form to the looseness allowing form to thereby move the rope connection part, to which the other end of the jib-side support rope and the other end of the boom-side support rope are connected, from the tensioning position to the looseness allowing position;

a step of removing one end of the jib-side support rope from the jib distal end of the jib lying down and removing the other end of the jib-side support rope from the rope connection part located at the looseness allowing position;

a step of removing one end of the boom-side support rope from the rope connection place of the boom lying down and removing the other end of the boom-side support rope from the rope connection part located at the looseness allowing position;

a step of removing the jib proximal end from the boom distal end of the boom lying down to thereby separating the jib from the boom; and a step of removing the boom proximal end of the boom lying down from the crane body to thereby separate the boom from the crane body, wherein the step of shifting the jib mast from the tension form to the looseness allowing form to thereby move the rope connection part from the tensioning position to the looseness allowing position includes removing the jib-mast proximal end of the jib mast in the uprise posture from the uprising-proximal-end support part and thereafter shifting the jib mast from the uprise posture to the looseness-allowing lying posture to make the lying-proximal-end holding part hold the jib-mast proximal end.

10. The crane according to claim 1, wherein:

the jib mast includes a lower mast member attached to the attachment object rotatably about an axis parallel to the jib rotation axis and an upper mast member attached to the lower mast member so as to be protrusible from and retractable into the lower mast member, the rope connection part being provided on the upper mast member;

the tension form of the jib mast is a state where the lower mast member is in a posture of extending from the attachment object backward of the attachment object and the upper mast member has been protruded from the lower mast member to a protrusion position, which is a position to locate the rope connection part at the tensioning position; and the looseness allowing form of the jib mast is a state where the lower mast member is in a posture of extending from the attachment object backward of the attachment object and the upper mast member has been retracted into the lower mast member to a retraction position, which is a position to locate the rope connection part at the looseness allowing position.

11. The crane according to claim 10, wherein the jib mast further includes a position fixing member that fixes the upper mast member having been protruded to the protrusion position to the lower mast member at the protrusion position.

12. The crane according to claim 10, wherein the jib mast further includes a protrusion prevention unit that prevents the upper mast member from protrusion from the lower mast member beyond the protrusion position.

13. A method of assembling the crane according to claim 10, comprising:

a step of attaching the boom proximal end to the crane body and placing the boom in a posture of lying down so as to extend frontward from the crane body;

a step of attaching the jib proximal end to the boom distal end of the boom lying down and placing the jib in a posture of lying down so as to extend frontward from the boom distal end;

a step of rendering the jib mast in the looseness allowing form to thereby locate the rope connection part at the looseness allowing position;

a step of connecting one end of the jib-side support rope to the jib distal end of the jib lying down and connecting the other end of the jib-side support rope to the rope connection part located at the looseness allowing position to thereby install the jib-side support rope between the jib distal end and the rope connection part;

a step of connecting one end of the boom-side support rope to the rope connection place of the boom lying down and connecting the other end of the boom-side support rope to the rope connection part located at the looseness allowing position to thereby install the boom-side support rope between the rope connection place of the boom and the rope connection part;

a step of shifting the jib mast from the looseness allowing form to the tension form to thereby move the rope connection part, to which the other end of the jib-side support rope and the other end of the boom-side support rope are connected, from the looseness allowing position to the tensioning position; and a step of raising the boom so as to bring the jib into the predetermined frontward tilt posture to render the jib-side support rope linearly tensioned between the jib distal end and the rope connection part located at the tensioning position and to render the jib-side boom-side support rope linearly tensioned between the rope connection place of the boom and the rope connection part located at the tensioning position, thereby making the jib in the predetermined frontward tilt posture be supported by the jib-side support rope, the boom-side support rope and the jib mast on a back side of the jib to retain the jib in the predetermined frontward tilt posture, wherein:

the step of rendering the jib mast in the looseness allowing form to thereby locate the rope connection part at the looseness allowing position includes rendering the lower mast member in a posture of extending from the attachment object backward of the attachment object and retracting the upper mast member into the lower mast member to the retraction position; and the step of shifting the jib mast from the looseness allowing form to the tension form to thereby move the rope connection part from the looseness allowing position to the tensioning position includes protruding the upper mast member from the lower mast member to the protrusion position while rendering the lower mast member in a posture of extending from the attachment object backward of the attachment object.

14. A method of disassembling the crane according to claim 10, comprising:

a step of laying down the boom and the jib so that the boom extends frontward from the crane body and the jib extends frontward from the boom distal end of the boom;

a step of shifting the jib mast from the tension form to the looseness allowing form to thereby move the rope connection part, to which the other end of the jib-side support rope and the other end of the boom-side support rope are connected, from the tensioning position to the looseness allowing position;

a step of removing one end of the jib-side support rope from the jib distal end of the jib lying down and removing the other end of the jib-side support rope from the rope connection part located at the looseness allowing position;

a step of removing one end of the boom-side support rope from the rope connection place of the boom lying down and removing the other end of the boom-side support rope from the rope connection part located at the looseness allowing position;

a step of removing the jib proximal end from the boom distal end of the boom lying down to thereby separating the jib from the boom; and a step of removing the boom proximal end of the boom lying down from the crane body to thereby separate the boom from the crane body, wherein the step of shifting the jib mast from the tension form to the looseness allowing form to thereby move the rope connection part from the tensioning position to the looseness allowing position includes retracting the upper mast member into the lower mast member from the protrusion position to the retraction position while rendering the lower mast member in a posture of extending from the attachment object backward of the attachment object.

15. The crane according to claim 1, wherein:

the jib mast includes a lower mast member attached to the attachment object rotatably about an axis parallel to the jib rotation axis and an upper mast member connected to the lower mast member rotatably about an axis parallel to the jib rotation axis, the rope connection part being provided on the upper mast member;

the tension form of the jib mast is a state where the lower mast member extends from the attachment object backward of the attachment object and the upper mast member is in a stretching posture of extending along the extension of the lower mast member in the same direction as the lower mast member;

the looseness allowing form of the jib mast is a state where the lower mast member is in an inclination posture of extending so as to go away from the jib backward of the jib from the attachment object toward the jib distal end and the upper mast member is in a bending posture of extending so as to further go away from the jib backward of the jib from a connection place at which the upper lower member is connected to the lower mast member toward the boom distal end.

16. The crane according to claim 15, wherein the jib mast further includes a posture fixing member that fixes the upper mast member to the lower mast member in the stretching posture.

17. The crane according to claim 15, wherein the jib mast further includes a rotational-movement prevention part provided on one of the lower mast member and the upper mast member, the rotational-movement prevention part configured to prevent the upper mast member from rotational movement to a side opposite to the bending posture beyond the stretching posture.

18. The crane according to claim 15, wherein the jib posture retention device further includes a retainer that retains a posture of the lower mast member to the jib and retains a posture of the upper mast member to the lower mast member when the lower mast member is in the inclination posture and the upper mast member is in the bending posture.

19. The crane according to claim 18, wherein the retainer includes a lower retainer to be interposed between the lower mast member in the inclination posture and the jib so as to prevent the lower mast member from rotational movement in a direction to approach the jib from the inclination posture and an upper retainer to be interposed between the upper mast member in the bending posture and the lower mast member so as to prevent the upper mast member from rotational movement in a direction to approach the lower mast member from the bending posture.

20. The crane according to claim 19, wherein:

the lower retainer is configured to be interposable between the jib mast in the uprise posture and the jib so as to prevent the jib mast from rotational movement in a direction to be laid along the jib; and the upper retainer is configured to be interposable between the jib mast in the uprise posture and the boom distal end so as to prevent the jib mast from rotational movement in a direction opposite to the direction to be laid along the jib.

21. A method of assembling the crane according to claim 15, comprising:

a step of attaching the boom proximal end to the crane body and placing the boom in a posture of lying down so as to extend frontward from the crane body;

a step of attaching the jib proximal end to the boom distal end of the boom lying down and placing the jib in a posture of lying down so as to extend frontward from the boom distal end;

a step of rendering the jib mast in the looseness allowing form to thereby locate the rope connection part at the looseness allowing position;

a step of connecting one end of the jib-side support rope to the jib distal end of the jib lying down and connecting the other end of the jib-side support rope to the rope connection part located at the looseness allowing position to thereby install the jib-side support rope between the jib distal end and the rope connection part;

a step of connecting one end of the boom-side support rope to the rope connection place of the boom lying down and connecting the other end of the boom-side support rope to the rope connection part located at the looseness allowing position to thereby install the boom-side support rope between the rope connection place of the boom and the rope connection part;

a step of shifting the jib mast from the looseness allowing form to the tension form to thereby move the rope connection part, to which the other end of the jib-side support rope and the other end of the boom-side support rope are connected, from the looseness allowing position to the tensioning position; and a step of raising the boom so as to bring the jib into the predetermined frontward tilt posture to render the jib-side support rope linearly tensioned between the jib distal end and the rope connection part located at the tensioning position and to render the boom-side support rope linearly tensioned between the rope connection place of the boom and the rope connection part located at the tensioning position, thereby making the jib in the predetermined frontward tilt posture be supported by the jib-side support rope, the boom-side support rope and the jib mast on a back side of the jib to retain the jib in the predetermined frontward tilt posture, wherein:

the step of rendering the jib mast in the looseness allowing form to thereby locate the rope connection part at the looseness allowing position includes rendering the lower mast member in the inclination posture and rendering the upper mast member in the bending posture; and the step of shifting the jib mast from the looseness allowing form to the tension form to thereby move the rope connection part from the looseness allowing position to the tensioning position includes rendering the lower mast member in a posture of extending from the attachment object backward of the attachment object and rendering the upper mast member in the stretching posture.

22. A method of disassembling the crane according to claim 15, comprising:

a step of laying down the boom and the jib so that the boom extends frontward from the crane body and the jib extends frontward from the boom distal end of the boom;

a step of shifting the jib mast from the tension form to the looseness allowing form to thereby move the rope connection part, to which the other end of the jib-side support rope and the other end of the boom-side support rope are connected, from the tensioning position to the looseness allowing position;

a step of removing one end of the jib-side support rope from the jib distal end of the jib lying down and removing the other end of the jib-side support rope from the rope connection part located at the looseness allowing position;

a step of removing one end of the boom-side support rope from the rope connection place of the boom lying down and removing the other end of the boom-side support rope from the rope connection part located at the looseness allowing position;

a step of removing the jib proximal end from the boom distal end of the boom lying down to thereby separating the jib from the boom; and a step of removing the boom proximal end of the boom lying down from the crane body to thereby separate the boom from the crane body, wherein the step of shifting the jib mast from the tension form to the looseness allowing form to thereby move the rope connection part from the tensioning position to the looseness allowing position includes shifting the lower mast member in a posture of extending from the attachment object backward of the attachment object to the inclination posture and shifting the upper mast member in the stretching posture to the bending posture.

23. A method of assembling the crane according to claim 1, comprising:

a step of attaching the boom proximal end to the crane body and placing the boom in a posture of lying down so as to extend frontward from the crane body;

a step of attaching the jib proximal end to the boom distal end of the boom lying down and placing the jib in a posture of lying down so as to extend frontward from the boom distal end;

a step of rendering the jib mast in the looseness allowing form to thereby locate the rope connection part at the looseness allowing position;

a step of connecting one end of the jib-side support rope to the jib distal end of the jib lying down and connecting the other end of the jib-side support rope to the rope connection part located at the looseness allowing position to thereby install the jib-side support rope between the jib distal end and the rope connection part;

a step of connecting one end of the boom-side support rope to the rope connection place of the boom lying down and connecting the other end of the boom-side support rope to the rope connection part located at the looseness allowing position to thereby install the boom-side support rope between the rope connection place of the boom and the rope connection part;

a step of shifting the jib mast from the looseness allowing form to the tension form to thereby move the rope connection part, to which the other end of the jib-side support rope and the other end of the boom-side support rope are directly connected, from the looseness allowing position to the tensioning position while keeping the rope connection part attached to the jib mast; and a step of raising the boom so as to bring the jib into the predetermined frontward tilt posture to render the jib-side support rope linearly tensioned between the jib distal end and the rope connection part located at the tensioning position and to render the boom-side support rope linearly tensioned between the rope connection place of the boom and the rope connection part located at the tensioning position, thereby making the jib in the predetermined frontward tilt posture be supported by the jib-side support rope, the boom-side support rope and the jib mast on a back side of the jib to retain the jib in the predetermined frontward tilt posture.

24. A method of disassembling the crane according to claim 1, comprising:

a step of laying down the boom and the jib so that the boom extends frontward from the crane body and the jib extends frontward from the boom distal end of the boom;

a step of shifting the jib mast from the tension form to the looseness allowing form to thereby move the rope connection part, to which the other end of the jib-side support rope and the other end of the boom-side support rope are connected, from the tensioning position to the looseness allowing position while keeping the rope connection part attached to the jib mast;

a step of removing one end of the jib-side support rope from the jib distal end of the jib lying down and removing the other end of the jib-side support rope from the rope connection part located at the looseness allowing position;

a step of removing one end of the boom-side support rope from the rope connection place of the boom lying down and removing the other end of the boom-side support rope from the rope connection part located at the looseness allowing position;

a step of removing the jib proximal end from the boom distal end of the boom lying down to thereby separating the jib from the boom; and a step of removing the boom proximal end of the boom lying down from the crane body to thereby separate the boom from the crane body.

* * * * *